(12) United States Patent
Besecker et al.

(10) Patent No.: US 11,734,929 B2
(45) Date of Patent: Aug. 22, 2023

(54) ENHANCED PRODUCT VISUALIZATION TECHNOLOGY WITH WEB-BASED AUGMENTED REALITY USER INTERFACE FEATURES

(71) Applicant: Marxent Labs LLC, Miamisburg, OH (US)

(72) Inventors: Bret Besecker, St. Petersburg, FL (US); Barry Besecker, Xenia, OH (US); Vincent Anthony Kilian, Dayton, OH (US); Jeffrey Rudderman, St. Petersburg, FL (US)

(73) Assignee: Marxent Labs LLC, Miamisburg, OH (US)

( * ) Notice: Subject to any disclaimer, the term of this patent is extended or adjusted under 35 U.S.C. 154(b) by 0 days.

(21) Appl. No.: 17/816,115

(22) Filed: Jul. 29, 2022

(65) Prior Publication Data

US 2023/0177832 A1 Jun. 8, 2023

Related U.S. Application Data

(60) Provisional application No. 63/286,693, filed on Dec. 7, 2021.

(51) Int. Cl.
*G06Q 30/0601* (2023.01)
*G06T 19/00* (2011.01)
(Continued)

(52) U.S. Cl.
CPC .......... *G06V 20/20* (2022.01); *G06F 16/9577* (2019.01); *G06Q 30/0601* (2013.01); *G06T 19/006* (2013.01)

(58) Field of Classification Search
None
See application file for complete search history.

(56) References Cited

U.S. PATENT DOCUMENTS 7,643,692 B2 1/2010 Dittlo
9,818,228 B2 * 11/2017 Lanier .................. H04W 12/06
(Continued)

FOREIGN PATENT DOCUMENTS

EP 1732042 12/2006
EP 2317478 5/2011

OTHER PUBLICATIONS

Nicole Levine, "How to Use IKEA Place on iPhone or iPad", youtube.com, URL: https://www.wikihow.tech/Use-IKEA-Place-on-iPhone-or-iPad (Year: 2019).*
(Continued)

*Primary Examiner* — David H Chu
(74) *Attorney, Agent, or Firm* — Sheppard Mullin Richter & Hampton LLP

(57) ABSTRACT

Systems and methods for enhancing computer-generated visualization of items, including enhancing visualization of product images in a web-based augmented reality (AR) user interface, displaying elements that enable users to select AR-enabled images of products (e.g., room décor, furniture, or other products), and transmitting AR-enabled images of the products in a room to one or more distributed computer systems (e.g., in real time). These and other images may be saved or selected in the various platforms, web-based documents, or locally-run applications as AR-enabled images of products to view a set of user-selected AR-enabled images in a single view (e.g., on a web page), and, when in a room, selectively display and interact with an AR-enabled view in the room of the corresponding products from the AR-enabled images list.

32 Claims, 25 Drawing Sheets

(51) Int. Cl.
*G06V 20/20* (2022.01)
*G06F 16/957* (2019.01)

(56) References Cited

U.S. PATENT DOCUMENTS

| | | | |
|---|---|---|---|
| 10,083,542 | B1 | 9/2018 | Murao |
| 10,223,740 | B1 | 3/2019 | Gore |
| 2012/0249544 | A1 | 10/2012 | Maciocci |
| 2014/0152558 | A1* | 6/2014 | Salter .................. G06F 3/011 |
| | | | 345/157 |
| 2015/0316985 | A1* | 11/2015 | Levesque .............. G06F 3/016 |
| | | | 345/156 |
| 2017/0336863 | A1 | 11/2017 | Tilton |
| 2018/0197339 | A1* | 7/2018 | Puvvada Sathyanarayana ........... |
| | | | G06Q 30/0643 |
| 2020/0320792 | A1* | 10/2020 | Sadalgi ............... G06F 3/04845 |

OTHER PUBLICATIONS

Roomie, "Roomie: Plan, Furnish, Configure and Buy", Mar. 16, 2017, youtube.com, URL: https://www.youtube.com/watch?v=n_HdmyPZBaM (Year: 2017).* ikea.com, "Welcome to IKEA USA", Dec. 4, 2021, URL: https://web.archive.org/web/20211204042836/https://www.ikea.com/us/en/ (Year: 2021).*

Michelle Higgins, "How Would That Couch Look at Home? Check Your Phone", Oct. 3, 2017, URL: https://www.nytimes.com/2017/10/03/style/apps-for-decorating-rooms.html (Year: 2017).*

International Patent Application No. PCT/US2018/059208, Notification of Transmittal of the International Search Report and the Written Opinion of the International Searching Authority, or the Declaration, dated Apr. 3, 2019, 10 pages.

International Patent Application No. PCT/US2018/062578, Notification of Transmittal of the International Search Report and the Written Opinion of the International Searching Authority, or the Declaration, dated Mar. 11, 2019, 10 pages.

Merrell et al., "Interactive Furniture Layout Using Interior Design Guidelines," ACM Transactions on Graphics, vol. 30, No. 4, Jul. 2011, 9 pages.

Orr, Susan, "Area Macy's Store Adds Virtual Reality Technology", <URL: https://www.ibj.com/blogs/19-property-lines/post/71071-area-macys-store-adds-virtual-reality-technology?utm_source=ibj-daily&utm_medium=newsletter&utm_campaign=2018-10-26#>, Oct. 26, 2018, 4 pages.

* cited by examiner

ENHANCED PRODUCT VISUALIZATION TECHNOLOGY WITH WEB-BASED AUGMENTED REALITY USER INTERFACE FEATURES

CROSS REFERENCE TO RELATED APPLICATIONS

This application claims the benefit of U.S. Patent Application No. 63/286,693, filed on Dec. 7, 2021, which is incorporated by reference in its entirety for all purposes.

TECHNICAL FIELD

The disclosed technology relates generally to enhancing computer-generated visualization of items, including enhancing visualization of product images in a web-based augmented reality (AR) user interface, displaying elements that enable users to select AR-enabled images of products (e.g., room décor, furniture, or other products), and transmitting an AR-enabled view of the products in a room to one or more distributed computer systems (e.g., in real-time). These and other images may be saved or selected in the various platforms, web-based documents, or locally-run applications as AR-enabled images of products to view a list of user-selected AR-enabled images in a single view (e.g., on a web page), and, when in a room, selectively display and interact with an AR-enabled view in the room of the corresponding products from the AR-enabled images list.

BACKGROUND

AR is generally implemented as an interactive software application that enhances an image of a user's physical environment as it is viewed through a computer screen. AR supplements parts of the user's physical environment, when viewed through the computer screen, with computer-generated input. When the user views at the computer screen, the user can see the image of the physical environment incorporated with the computer-generated input. Some AR implementations require a dedicated mobile application. One drawback of this is that it requires a user to download the application to their mobile device, which is not always desirable.

Various web-based AR technologies have been developed. Web-based AR technologies typically require a user to use a web browser on a mobile phone (or other mobile devices), without a separate mobile application, to search for products of interest and select a product of interest to view within a field of view of the device, if the product has an AR-enabled image. If the user wants to view another product, they must do another search and select another product to view. However, existing web-based AR implementations suffer from various drawbacks.

One of the problems with existing web-based AR implementations is that the process is inefficient. It is difficult for users to compare products. In some cases, a user must navigate to new products on the same website or other websites and/or navigate across various web pages. This can be time-consuming, inconvenient, and suffers from other drawbacks.

Another issue arises when a user is searching for products on a desktop computer and/or when they are not in the room within which they want to see the AR view of the product(s). In at least some of these scenarios, the user is not able to view an AR-enabled image of the product.

These and other drawbacks exist with known systems.

SUMMARY

Systems, methods, and computer-readable media are disclosed for enhancing computer-generated visualization of items, including enhancing visualization of product images in a web-based augmented reality (AR) user interface, displaying elements that enable users to select AR-enabled images of products (e.g., room décor, furniture, or other products), and transmitting AR-enabled images of the products in a room to one or more distributed computer systems (e.g., in real time). These and other images may be saved or selected in the various platforms, web-based documents, or locally-run applications as AR-enabled images of products to view a list of user-selected AR-enabled images in a single view (e.g., on a web page), and, when in a room, selectively display and interact with an AR view in the room of the corresponding products from the list of AR-enabled images.

One aspect of the disclosure relates to a web-based AR system with user interface functionality associated with a webpage of product images. The user may interact with the product images through various methods, including a "view in AR room" (or similarly labeled) icon that indicates the product images that are AR-enabled images that can be viewed in an AR-generated image of the user's physical environment. The interface functionality may include other features, including an "add to AR list" (or similarly labeled) icon that enables users to save a list of AR-enabled images of products and access the list at a separate computing location (e.g., a separate webpage, a separate computing device, or other embodiments discussed herein).

The "view in AR room" icon may initiate a process that can access a stored 3D image definition of the product located at a backend or cloud-based system. The user interface may generate a QR code (or similar identifier) that can link the 3D image definition of the product to a transferable image definition. When the user scans or otherwise activates the QR code, the user device can access the stored 3D image definition of the product and display the 3D image at a separate computer system.

The "add to AR list" icon may initiate a process that can add the product to a list of one or more products that can be transferrable and accessible at a separate computer system. For example, the user interface may provide the "add to AR list" icon. When activated, the corresponding product may be added to a list of one or more products to form a list of AR-enabled images of those products. The user interface may generate a QR code (or similar identifier) that can link to the 3D image definitions of the list of AR-enabled images. When the user scans the QR code at the user interface (or otherwise activates the QR code), the user device can locally display the 3D image definition accessible from the list. In some examples, the 3D images may be added to an AR-enabled environment presented at the separate computer system (e.g., in a similar configuration as the first screen, in a row of product images that is different than the first screen, or other configurations defined by the backend or cloud-based system).

The "add to AR list" display element provides a number of benefits. For example, if a user is searching for products when the user is using a desktop computer or are not in the room for which they are shopping, the user can easily save the products to a list of AR-enabled images and, when in the room, selectively display an AR-enabled view of the saved products from the AR list in the room. The "add to AR list" feature also provides a convenient way to create a place where products associated with AR-enabled images are stored in one place. This can enable an easy way for the user to view and compare products and display them in the user's room when the user is physically located in the same room.

According to some embodiments of the disclosure, a user may generate a list of AR-enabled images of products using the "add to AR list" feature. For example, the user may be searching for products on a desktop and then later access the list of AR-enabled images to a mobile device (e.g., when the user is in the room for which they are shopping or at other times).

Given the cost and complexity of creating AR-enabled images, in some cases, not all products in a product catalog hosted by the system may have AR-enabled images. This can be confusing and frustrating to users who can select some products for which they can see an AR-enabled image view, but not others. This is a drawback of websites that host a product catalog and have a fixed display option to view the AR-enabled image of the product in the user's room.

To overcome these and other drawbacks, one aspect of the disclosure relates to a dynamically generated user interface element that enables users to select and see an AR-enabled image view when the product selected has a corresponding AR-enabled image. By showing (e.g., dynamically) the "view in AR room" display option when the product selected has a corresponding AR-enabled image, the drawbacks of static user interface display options are overcome.

According to another aspect of the disclosure, a web-based AR desktop application may have included a user interface display element that includes a bar code (e.g., QR code, etc.). Upon scanning the bar code via a user's mobile device (e.g., smartphone, tablet, or other camera-enabled devices), the list of AR-enabled images of products may be displayed on the user's mobile device. Then, a user can select from the displayed list of products to view the selected products individually and/or in groups in an AR-enabled view in the user's room. Among other things, this enables a user to search for and explore products on a desktop application (which need not be done in the user's home) and easily transfer the list of AR-enabled images of products to a mobile device for the user to use to see the AR-enabled images of selected products in the desired room using AR technology.

According to some examples, a user interface may include any of the following features for a selected product, including a product display area, an "add to AR list" element, a "badge" that can appear over the "add to AR list" element to display the number of products in the list of AR-enabled images, an AR list element, a "view in-home" element, an "add-to-cart" element, a "shared" element, or a menu option to select other displays/features. The "add to AR list" element may enable a user to select the displayed product for inclusion in the user's saved AR list), which may be dynamically generated by the system to be displayed when the selected product has a corresponding AR-enabled image in the system. The AR list element may enable a user to select to see a single page with the user's selection of products for which the user has selected to add to the AR list. The "view in-home" element may enable the user to select to display an AR-enabled view of the selected product in a room in which the user is located at the time. The "add-to-cart" element may enable the user to purchase the selected product through a payment transaction process. The "shared" element may enable the user to share the product or product image with other user devices. The menu option to select other displays/features may include features to enable the user to add one or more products (e.g., 3D models of the products) to a virtual room planner. Many traditional web AR implementations are point solutions (i.e. they only perform that one function). According to another aspect of the disclosure, the system improve traditional systems by including various functionalities that work together to provide technical advantages and synergies over traditional systems.

According to some embodiments, the system of the disclosure may include a set of functionalities that interact to provide a more robust technology solution. For example, the system may include one or more product catalogs stored online, at least some of which have corresponding AR-enabled images and at least some of which may be 3D model-enabled and a 3D room design functionality via which a user can select products and create a room design. According to some embodiments, through a singles application, the user can search for products, view products for which AR-enabled images are available in an AR-enabled view in the room and, for products of interest, the user can select the product and place a 3D model of it in the desired location in a virtual view of the room via the room planner, and purchase the desired products all within an integrated application. Based on the design of the data structure of the 3D model, a corresponding stock-keeping unit (SKU) from a retailer can be included. This facilitates the ability for the applications and/or a user to add products from the room planner to a shopping cart to enable the user to purchase the selected products. This integrated functionality provides great synergies for the user and facilitates the entire product search, room design, and purchase experience.

According to another aspect of these embodiments, the system may enable the user to select from a catalog of inspirational photos of a room to facilitate the design process. Individual products or one or more groups of products in the photo may have corresponding 3D models and/or AR-enabled images. This enables a user to select an inspirational photo, view products for which AR-enabled images are available in an AR-enabled view in the room, and/or for products of interest, the user can select the product and place a 3D model of it in the desired location in a virtual view of the room via the room planner. In some embodiments, the application may automatically arrange a group of products from the inspirational photo into the room planner. The arrangement may be based on the arrangement of the group of products in the inspirational photo, but modified by the application based on features of the actual room in which the user is selecting products for.

According to another aspect of these embodiments, there can be other aspects of integration between the AR-enabled view features and the 3D room planner features. For example, if a user selects a product to add to the AR list, the same product can automatically be added to a favorite products page in the room planner module. Additionally, in AR mode, if a user views a room (e.g., while viewing an AR-enabled image in the room), the application can also scan the room for configuration, dimensions, structural features (e.g., doors, windows and/or other features), and other room elements. The room information from the AR scan can be used to generate at least an outline or a more detailed layout of the room for use in the 3D room planner.

The system may comprise a cloud-based platform that hosts a product catalog for a retailer (or other entity). The product catalog may be viewable via one or more product display pages. The product catalog may be searchable via web-based search functions. The user interface for the product display pages and/or search results pages may include a set of display elements that provide the user interface functionality described herein, including a "view in AR room" (or similarly labeled) icon that indicates the product images that are AR-enabled images and that further includes another icon on the user interface that is a "add to AR list" (or similarly labeled) icon that enables users to save a list of AR-enabled images of products.

According to other embodiments of the disclosure, the features described herein may be applicable to photos of a single product or multiple products. For example, the system may include a photo-to-floor plan feature whereby a user may view a photograph of multiple products arranged in a predetermined layout within a room. The system may be preconfigured to enable individual ones of the multiple products in the photograph to have a corresponding AR-enabled image of the product. Alternatively, or in addition, a set of some or all of the multiple products in the photo may have corresponding AR-enabled images. Additionally, the system may be preconfigured to enable individual ones of the multiple products in the photograph to have a corresponding 3D model of the product. The individual or set of products can be displayed in an AR-enabled view of a physical environment. Alternatively, or in addition, a set of some or all of the multiple products in the photo may have a corresponding 3D model of the set of products. The 3D model(s) of the individual or set of products can be display in a virtual room planner corresponding with a physical environment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any disclosures described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting the breadth, scope, or applicability thereof. It should be noted that for clarity and ease of illustration these drawings are not necessarily made to scale.

Figure 1:
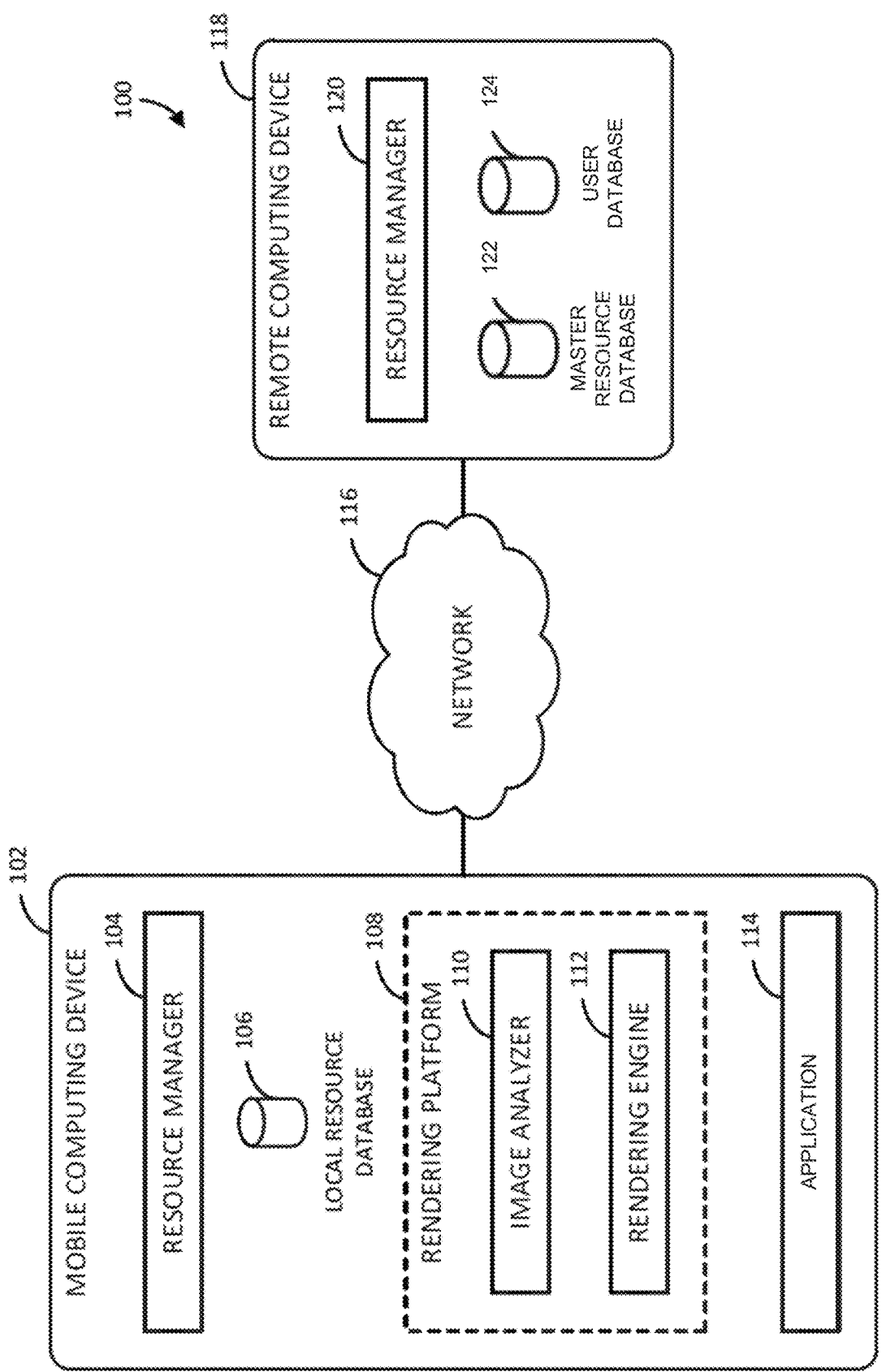
FIG. 1 is a block diagram of at least one example of a system for enhancing product visualization, in accordance with one or more embodiments disclosed herein.

The figures are not intended to be exhaustive or to limit the disclosure to the precise form disclosed. It should be understood that the disclosure can be practiced with modification and alteration and that the disclosed technology be limited only by the claims and the equivalents thereof.

DETAILED DESCRIPTION OF THE EMBODIMENTS

For the purposes of promoting an understanding of the principles of the present disclosure, reference will now be made to the examples illustrated in the drawings and the description of the same. It will nevertheless be understood that no limitation of the scope of this disclosure is thereby intended.

Perhaps due to the form factor size limitations of mobile computing devices (e.g., smartphones, tablets, etc.), the devices cannot often support such robust dedicated graphics hardware as non-mobile computing devices (e.g., desktops, servers, etc.). As such, rendering such virtual objects for use in mobile applications can oftentimes appear choppy and can require excessive overhead and/or bandwidth to interface with a remote rendering engine.

Moreover, some users may not want to download an augmented reality and/or virtual reality application or have enough storage space available on their mobile device for efficient deployment of the augmented reality and/or virtual reality application. Accordingly, improvements in technologies for composing a virtual or augmented reality setting and/or rendering virtual or augmented reality objects in a mobile computing environment may be useful.

For example, it may be useful and/or an improvement over traditional methods to provide one or more techniques to access and interact with a list of AR-enabled images of a product using a software application (e.g., web application) without downloading a separate software application to a user's mobile device. The software application may be configured to select one or more AR-enabled images of products (e.g., room décor, furniture, or other products) and select to view an AR-enabled images of the product in a room. The software application may also be configured to add one or more AR-enabled images of products to an AR list. The AR list may be accessible in multiple application, including to view a set of user-selected AR-enabled images of products on a single interface (e.g., on a web page). When displaying a virtual room at the mobile device by the software application, the software application may selectively display an AR-enabled images of the products in the AR-enabled room. Once the AR-enabled images of the products are displayed, the application can narrow down features and/or objects, selectable from a dynamically expandable database, that may be added to the AR environment. The addition of features/objects may be based on one or more dynamically updated rules and/or metadata corresponding to the features/objects relative to the AR environment.

FIG. 1 is an illustrative system 100 for composing a virtual or augmented reality setting in a mobile computing environment that includes a mobile computing device 102 and a remote computing device 118 communicatively coupled via a network 116. The illustrative mobile computing device 102 includes a resource manager 104 and an application 114. Application 114 may be a software application for displaying web-based documents (e.g., web browser, etc.) or other types of information, as described further herein. Application 114 of mobile computing device 102 interfaces with a user (e.g., via a touchscreen display) to compose a virtual or augmented reality setting, the virtual or augmented reality setting comprising a virtual environment and/or virtual objects (e.g., 3D models) rendered in the virtual environment. Application 114 may be embodied as any combination of hardware, firmware, software, and/or circuitry usable to perform the functions described herein. To do so, the illustrative mobile computing device 102 also may capture a series of images using a camera (see, e.g., the camera sensor 214 of FIG. 2) of mobile computing device 102 or access a list of AR-enabled images of products from web pages accessible via network 116.

In some examples, mobile computing device 102 may scan a Quick Response (QR) code or other machine-readable code that contains a location, identifier, or other information about application 114. Scanning (with a camera incorporated with mobile computing device 102, etc.) and selecting the QR code may direct application 114 to a particular website or Uniform Resource Locator (URL). Application 114 may be launched at mobile computing device 102 to allow the user to browse for products and visualize them in an AR-enabled environment. In other examples, application 114 may be launched at mobile computing device 102 with one or more products cached with the application for quicker visualization in the AR-enabled environment.

For one or more, or each, the captured image, mobile computing device 102 may be configured to determine at least one position within the image at which to render one or more, or each, 3D model relative to the environment captured by the image. Mobile computing device 102 (e.g., via image analyzer 110) may be configured to extract relevant feature data from the image (e.g., resolution, the field of view (FOV), focal length, imaging center, etc.), as well as to measure (see, e.g., the IMU sensor 216) information usable to track the movement of mobile computing device 102 relative to the environment, such as position/orientation data.

In use, a user of mobile computing device 102 can interact with images described throughout the disclosure in, for example, a virtual reality (VR) environment or an augmented reality (AR) environment. In the VR environment, the user may define a three-dimensional (3D) virtual environment via a touchscreen display 210 of mobile computing device 102. The user of mobile computing device 102 then selects and/or places one or more 3D models relative to the virtual environment (e.g., via a touchscreen display 210 of mobile computing device 102). For example, the user may design and/or configure a virtual environment comprising a virtual living space. The user may input a stock-keeping unit (SKU) and/or other identifier associated with a physical object for which application 114 has a corresponding 3D model, and/or may select a 3D model of a physical object from a list of 3D models. The user may select an initial position and/or orientation of the selected 3D model relative to the virtual environment captured by mobile computing device 102. The SKU and/or other identifiers may reference a (e.g., single) 3D model (e.g., a piece of furniture) and/or more than one 3D model (e.g., a set of furniture). In other words, more than one 3D model can be selected for rendering in the virtual environment at any given time. In one or more techniques, for example, in which more than one 3D model may be referenced, one or more, or each, 3D model may be considered an individual 3D model and/or positioned/orientated as an individual 3D model relative to the other 3D models, and/or may be treated as a group of 3D models positioned/oriented together.

In the AR environment, the user may not need to generate the virtual environment via the touchscreen display 210 of mobile computing device 102. Rather, the user may point the lens of mobile computing device 102 at the physical environment where mobile computing device 102 is located. The image of the physical environment may be captured by a lens incorporated with mobile computing device 102. In these examples, one or more AR-enabled images may be incorporated with the AR-enabled environment as it is displayed at mobile computing device 102.

In some examples, the virtual or AR environment may be accessed from a website. Application 114 may receive a webpage of product images, which includes a "view in AR room" (or similarly labeled) icon that indicates the product images that are AR-enabled images and an "add to AR list" (or similarly labeled) icon that enables users to save a list of AR-enabled images of products. Application 114 may dynamically generate a user interface element that enables users to select to see an AR-enabled images when the product selected has a corresponding AR-enabled image. Application 114 may show (dynamically) the "view in AR room" display option when the product selected has a corresponding AR-enabled image.

Subsequent to the selection of the 3D model(s) to be rendered, mobile computing device 102 may be configured to determine where the 3D model(s) to be rendered are stored, e.g., in local resource database 106 and/or master resource database 122. Local resource database 106 may be stored in physical memory that is located in various places, including a physical location that is local to mobile computing device 102 or a physical location that is remote from mobile computing device 102 (e.g., a shared cloud repository). The location of local resource database 106 should not be limited to physical storage at a physical location corresponding with mobile computing device 102, especially in the context of cloud computing embodiments. One or more, or each, 3D model may be packaged into a binary resource that includes its rendering components, as well as any physics information, audio information, rules, metadata, and/or any other overhead. Some or all contents of the local resource database 106 and/or the master resource database 122 may be updated and/or expanded continuously in real-time, periodically, and/or on-demand, for example via an Internet-based cloud connection, and/or the like.

Session information may be stored with user database 124, which can include a series of actions by the user of mobile computing device 102 on an individual website (e.g., hosted by remote computing device 118) accessed by web browser 114 within a given time frame. The session information may include, for example, search results comprising product identifiers, 3D-enabled objects, session ID, mobile device ID, products added to a shopping cart, or other information provided to or from the website. Any interaction that the user has with the website may be recorded as a web session. User database 124 may help enable consistency across web applications by storing session information at remote computing device 118 or mobile computing device 102 (e.g., in a cache, etc.).

Mobile computing device 102 may be embodied as any type of camera-equipped portable computing device capable of performing the functions described herein. Specifically, mobile computing device 102 may be embodied as any type of camera-equipped portable computing device that uses mobile-specific hardware and/or software components for operating and/or executing on mobile architecture. Illustrative examples of such mobile computing device 102 may include, but are not limited to, smartphones, wearables (e.g., smartwatches, smart glasses, etc.), tablets, laptops, etc. Accordingly, mobile computing device 102 may include any type of firmware, hardware, software, circuitry, and/or a combination thereof capable of performing the functions described herein.

Figure 2:
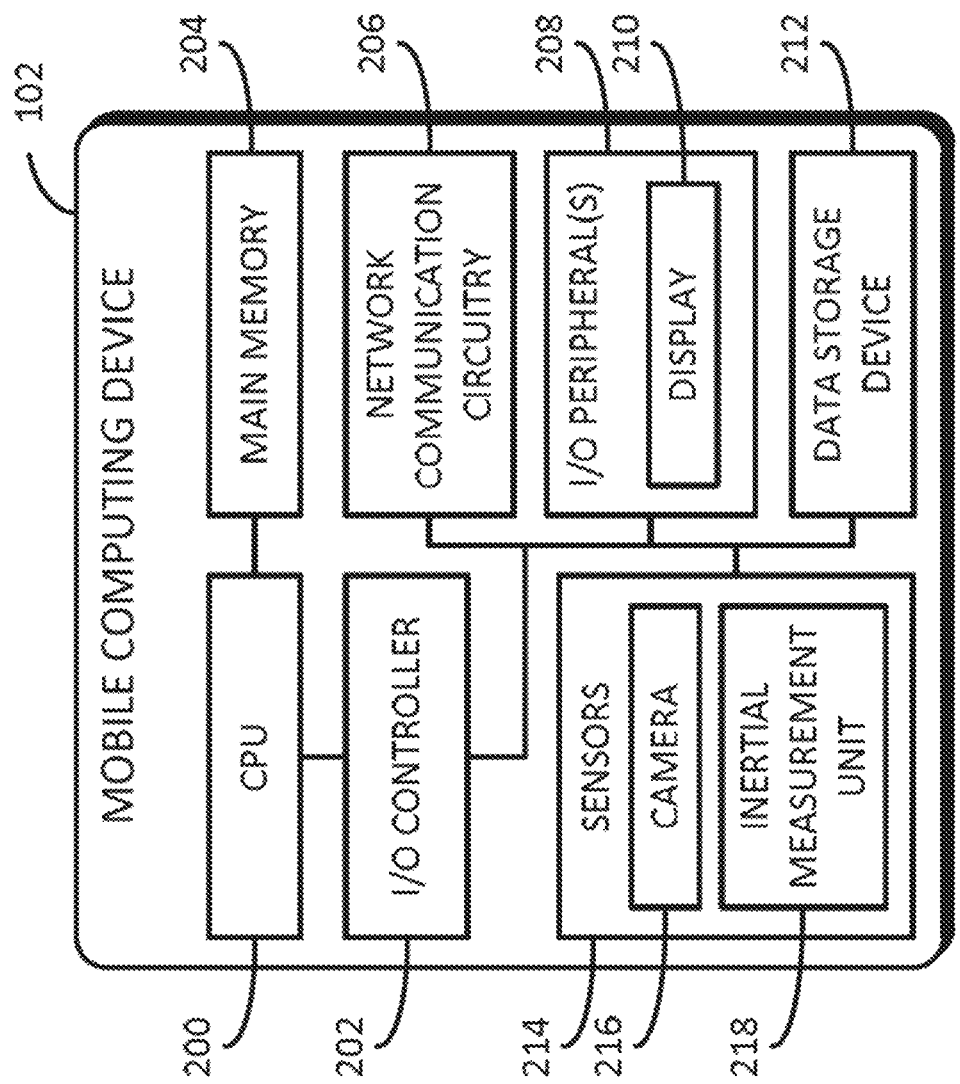
FIG. 2 is a block diagram of at least one example of a mobile computing device for accessing enhancing product visualization in a virtual or augmented reality setting in a mobile computing environment, in accordance with one or more embodiments disclosed herein.

Referring now to FIG. 2, the illustrative mobile computing device 102 includes central processing unit (CPU) 200, input/output (I/O) controller 202, memory 204, network communication circuitry 206, one or more I/O peripherals 208, data storage device 212, and/or various sensors 214. In some scenarios, there may be additional, fewer, and/or alternative components to those of the illustrative mobile computing device 102, such as a graphics processing unit (GPU). In some scenarios, one or more components may be combined on a single system-on-a-chip (SoC) on a single integrated circuit (IC). In some scenarios, the type of components of the respective mobile computing device 102 may be predicated upon the type and/or intended use of the respective mobile computing device 102.

CPU 200, or processor, may be embodied as any combination of hardware and/or circuitry capable of processing data. In some scenarios, mobile computing device 102 may include more than one CPU 200. depending on the scenario, CPU 200 may include one processing core (not shown), such as in single-core processor architecture, or multiple processing cores, such as in multi-core processor architecture. Irrespective of the number of processing cores and/or CPUs 200, CPU 200 is capable of reading and/or executing program instructions. In some scenarios, CPU 200 may include cache memory (not shown) that may be integrated directly with CPU 200 or placed on a separate chip with a separate interconnect to CPU 200. In some scenarios, pipeline logic may be used to perform software and/or hardware operations (e.g., network traffic processing operations), rather than commands issued to/from CPU 200.

The I/O controller 202, or I/O interface, may be embodied as any type of computer hardware and/or combination of circuitry capable of interfacing between input/output devices and/or mobile computing device 102. Illustratively, the I/O controller 202 may be configured to receive input/output requests from CPU 200, and/or send control signals to the respective input/output devices, thereby managing the data flow to/from mobile computing device 102.

Memory 204 may be embodied as any type of computer hardware and/or combination of circuitry capable of holding data and/or instructions for processing. Such memory 204 may be referred to as main or primary memory. In some scenarios, one or more components of mobile computing device 102 may have direct access to memory, such that certain data may be stored via direct memory access (DMA) independently of CPU 200.

Network communication circuitry 206 may be embodied as any type of computer hardware and/or combination of circuitry capable of managing network interfacing communications (e.g., messages, datagrams, packets, etc.) via wireless and/or wired communication modes. In some scenarios, the network communication circuitry 206 may include a network interface controller (NIC) capable of being configured to connect mobile computing device 102 to a computer network, as well as other devices, for example depending on the scenario.

One or more I/O peripherals 208 may be embodied as any auxiliary device configured to connect to and/or communicate with mobile computing device 102. For example, the I/O peripherals 208 may include but are not limited to, a mouse, a keyboard, a monitor, a touchscreen, a printer, a scanner, a microphone, a speaker, etc. Some I/O devices may be capable of one function (e.g., input or output), or both functions (e.g., input and/or output). The illustrative I/O peripherals 208 includes a display, which may be embodied as a touchscreen display capable of receiving user input via touch (e.g., one or more fingers, a stylus, etc.).

In some scenarios, I/O peripherals 208 may be connected to mobile computing device 102 via a cable (e.g., a ribbon cable, a wire, a universal serial bus (USB) cable, a high-definition multimedia interface (HDMI) cable, etc.) of mobile computing device 102. In some scenarios, the cable may be connected to a corresponding port (not shown) of mobile computing device 102 for which the communications made therebetween can be managed by I/O controller 202. In some scenarios, I/O peripherals 208 may be connected to mobile computing device 102 via a wireless mode of communication (e.g., Bluetooth®, Wi-Fi®, etc.) which can be managed by network communication circuitry 206.

Data storage device 212 may be embodied as any type of computer hardware capable of the non-volatile storage of data (e.g., semiconductor storage media, magnetic storage media, optical storage media, etc.). Such data storage devices 212 are commonly referred to as auxiliary and/or secondary storage, and/or may be used to store a large amount of data relative to memory 204 described above.

Illustrative sensors 214 include camera sensor 216 and/or inertial measurement unit (IMU) sensor 218. In some scenarios, sensors 214 may include one or more additional sensors 214. Camera sensor 216 may be embodied as a type of image sensor (e.g., complementary metal—oxide—semiconductor (CMOS), charge-coupled device (CCD), hybrid CCD/CMOS, etc.) capable of capturing different types of scene data, such as color image data (RGB), color and depth image data (RGBD camera), depth sensor, stereo camera (L/R RGB), YUV, GRAY scale, and/or any other image sensor technology that can generate digital image frames.

IMU sensor 218 may include one or more software and/or hardware gyroscopes to measure the orientation of mobile computing device 102 (e.g., a 3-axis gyroscope), accelerometers to measure the proper acceleration of mobile computing device 102 (e.g., a 3-axis accelerometer), magnetometers to measure the direction of the Earth's magnetic field relative to mobile computing device 102 (e.g., a 3-axis magnetometer), and/or any other type of inertial motion measurement software/hardware usable to perform the functions described herein (e.g., measure motion along three perpendicular linear axes and/or the rotation around, one or more, or each, of the three perpendicular linear axes).

Referring again to FIG. 1, resource manager 104, which may be embodied as any type of firmware, hardware, software, circuitry, and/or a combination thereof, may be configured to manage one or more 3D models stored in the local resource database 106. Resource manager 104 may be configured to retrieve the one or more 3D models from the local resource database 106 and/or transmit them to application 114, for example upon receiving a request from application 114 that includes identifying information for one or more, or each, object of which a 3D model is to be rendered. Resource manager 104 may also be configured to retrieve additional 3D models from remote computing device 118, and/or more particularly the resource manager 120 of remote computing device 118. The resource manager 120 can retrieve the requested one or more 3D models from a master resource database 122 of the remote computing device and/or return them to resource manager 104 via network 116.

Rendering platform 108 may be embodied as any combination of hardware, firmware, software, and/or circuitry usable to perform the functions described herein. The illustrative rendering platform 108 includes image analyzer 110 and/or rendering engine 112, one or more, or each, of which may be embodied as any type of firmware, hardware, software, circuitry, and/or a combination thereof, that may be configured to perform the functions described herein. In some scenarios, resource manager 104, image analyzer 110, and/or rendering engine 112 may include one or more computer-readable mediums (e.g., the memory 204, the data storage device 212, and/or any other media storage device) having instructions stored thereon and/or one or more processors (e.g., CPU 200) coupled with the one or more computer-readable medium and/or configured to execute instructions to perform the functions described herein.

Image analyzer 110, which may be embodied as any type of firmware, hardware, software, circuitry, and/or a combination thereof, may be configured to analyze the captured image to determine one or more features of the images captured by the mobile computing device 104, and/or more particularly by the camera sensor(s) 216 of the mobile computing device 104. Image analyzer 110 may be configured to generate a virtual image and/or virtual environment based on the captured image.

Rendering engine 112, which may be embodied as any type of firmware, hardware, software, circuitry, and/or a combination thereof, may be configured to generate a virtual image and/or virtual environment from a 2D and/or 3D model, such as may be received from the master resource database 122 of remote computing device 118 and/or stored in the local resource database 106 of the mobile computing device 102. Rendering engine 112 may be configured to render the objects in real-time (e.g., real-time rendering).

Web browser application 114 may be embodied as any type of network-based software application (e.g., cloud application, network application, software-as-a-service (SaaS) application, etc.) configured to communicate with remote computing device 118 (e.g., in a client-server architecture) over the network 116. Application 114 may be a browser application that accesses webpages (e.g., hosted by remote computing device 118, etc.) via network 116. As described herein, application 114 may be configured to serve as a software-based interface between the user (e.g., via a graphical user interface (GUI) of the application) and resource manager 104.

In some examples, application 114 may be configured to interface with image analyzer 110 to retrieve the identified features and/or rendering engine 112 to provide the image and/or objects to be rendered therein. In some scenarios, resource manager 104 may be a portion of application 114. In other words, resource manager 104 may be installed with the application, such that the initialization and/or the population of the 3D model data of the local resource database 106 is relative to the installation of application 114 and/or the execution of application 114. In some scenarios, one or more settings of resource manager 104 may be controlled by the user via the user interface of application 114.

Network 116 may be implemented as any type of wired and/or wireless network, including a local area network (LAN), a wide area network (WAN), a global network (the Internet), etc. Accordingly, network 116 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, computing devices, storage devices, etc.

Remote computing device 118 may be embodied as any type of computer and/or storage device capable of performing the functions described herein. For example, remote computing device 118 may be embodied as, but is not limited to, one or more servers (e.g., stand-alone, rack-mounted, etc.), computer devices, storage devices, routers, switches, and/or combination of computer blades and/or data storage devices (e.g., of a storage area network (SAN)) in a cloud architected network and/or data center. As such, while remote computing device 118 is illustrated as a single computing device, in some scenarios, remote computing device 118 may include more than one computing device (e.g., in a distributed computing architecture), one or more, or each, of which may be usable to perform at least a portion of the functions described herein.

It should be appreciated that remote computing device 118 may contain like components to that of the illustrative mobile computing device 102 of FIG. 2. Accordingly, such like components are not described herein to preserve clarity of the description. In some scenarios in which remote computing device 118 may include more than one computing device, one or more, or each, computing device of remote computing device 118 may include different components (e.g., hardware/software resources), the types of which may be predicated upon the type and/or intended use of one or more, or each, a computing device. For example, one or more computing devices of remote computing device 118 may be configured as a database server with less computer capacity relative to the computer capacity of another of the computing devices of remote computing device 118. Similarly, one or more other computing devices of remote computing device 118 may be configured as an application server with more computer capacity relative to the computer capacity of another computing device of remote computing device 118.

Figure 3:
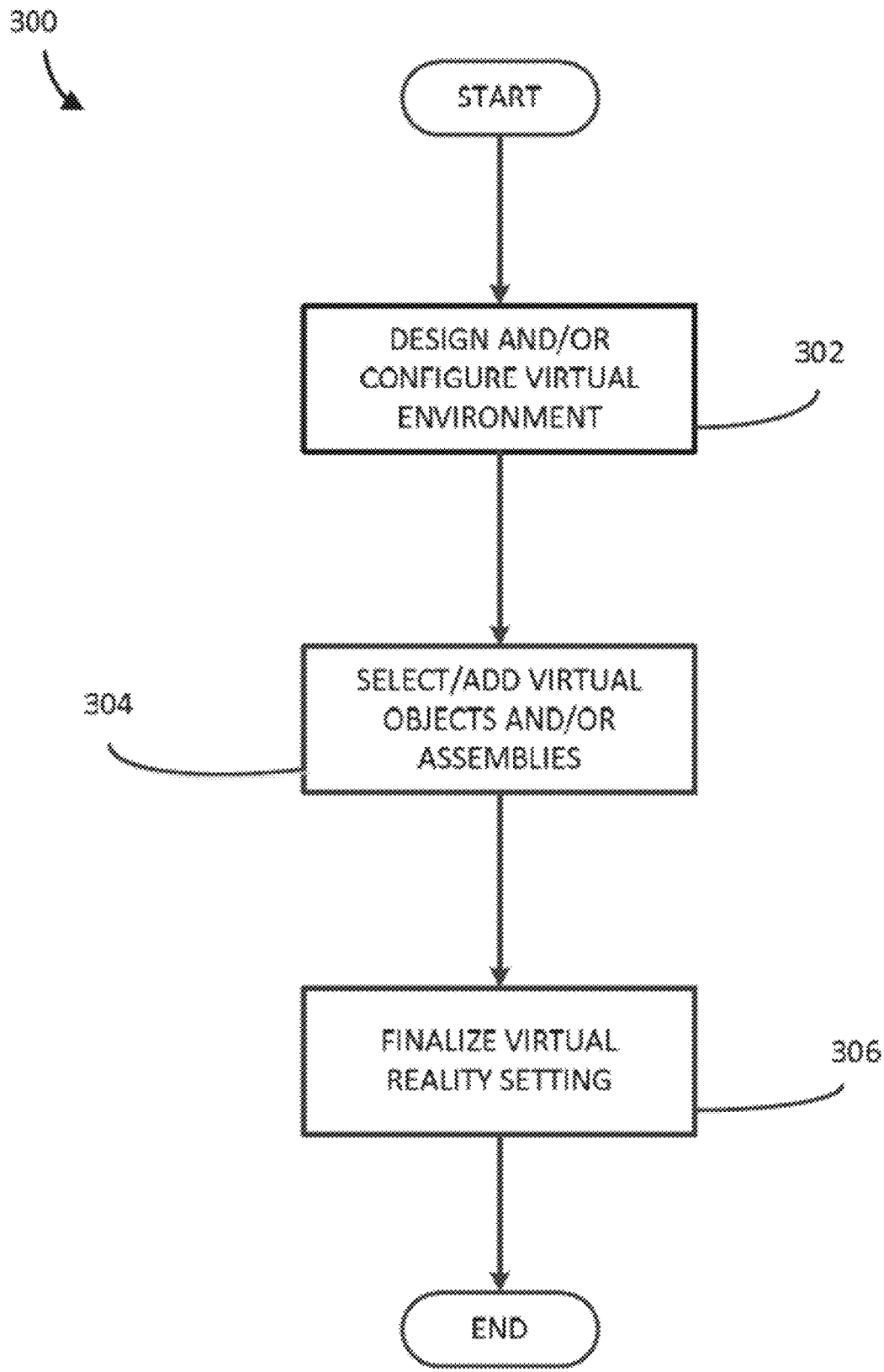
FIG. 3 is a flow diagram of at least one example method for composing a virtual or augmented reality setting in a mobile computing environment that may be executed by the mobile computing device of FIG. 1 and/or FIG. 2, in accordance with one or more embodiments disclosed herein.

Referring now to FIG. 3, an illustrative method 300 is provided for composing a virtual reality setting in a mobile computing environment that may be executed by a mobile computing device (e.g., mobile computing device 102 of FIG. 1), and/or more particularly by resource manager 104 and/or application 114 of mobile computing device 102. It should be appreciated that, prior to method 300 being invoked, local resource database 106 and/or master resource database 122 may include any number of 3D models of various objects.

In an illustrative example, a furniture outlet may have one hundred 3D models stored in the master resource database 122, which correspond to one hundred physical objects (e.g., pieces of furniture). Accordingly, despite the master resource database 122 having tens of thousands of 3D models, application 114 may be specific to that furniture outlet. In some scenarios, for example, when application 114 is launched, among other scenarios, resource manager 104 may be configured to pull an updated copy of those 3D models from the master resource database 122 for which application 114 has access (e.g., based on an identifier of application 114). In other words, resource manager 104 may pull/access the portions of master resource database 122 to which the application has access (e.g., just the one hundred 3D models of the illustrative example).

Method 300 begins in block 302, in which application 114 is used to compose a virtual environment on mobile computing device 102. In some scenarios, display 210 of mobile computing device 102 may be a touchscreen display responsive to contact from a human digit, stylus, and/or other input devices. Through interaction with display 210 of mobile computing device 102 and application 114, 3D boundaries of a virtual environment are established. Overhead lighting, doors, windows, flooring, floor coverings, and/or wall colors, and/or the like may be added to the virtual environment within the 3D boundaries.

In block 304, one or more virtual products (e.g., virtual objects and/or virtual assemblies) may be selected and/or added to the virtual environment designed/configured in block 302. As described herein, a user may indicate which 3D model(s) to render and/or a location at which to render the 3D model, for example, relative to the virtual environment captured by mobile computing device 102 (e.g., via the display 210 of mobile computing device 102 and/or via the camera sensor 216 of mobile computing device 102). Application 114 may request the 3D model from resource manager 104, for example, using identifiable information for the object represented by the 3D model. Resource manager 104 may determine whether the 3D model is stored in the local resource database 106. Resource manager 120 of remote computing device 118 may use the request to determine which 3D model is being requested and/or to return the requested 3D model to resource manager 104 of mobile computing device 102. for example, if the 3D model is not stored in the local database 106, among other scenarios, resource manager 104 of mobile computing device 102 may store the 3D model received from remote computing device 118 to the local resource database 106. Resource manager 104 may transmit the 3D model to rendering platform 108 such that rendering engine 112 of rendering platform 108 can render the object, for example, as a function of the 3D model received from resource manager 104 of mobile computing device 102, among other scenarios.

In block 306, the virtual reality setting may be finalized and/or readied for accessing by a virtual reality system. Composition of the virtual environment and/or selection and/or addition of virtual objects may be done iteratively. For example, a preliminary virtual environment may be composed, and then after virtual objects are selected and/or added, the virtual environment may be modified. Virtual objects may be added to and/or subtracted from the modified virtual environment and then may be modified again. The process can be repeated over and over, for example.

In one or more techniques, system 100 and/or mobile computing device 102 may be configured to determine the resolution, and therefore the file size, of 3D models on an object-specific and/or platform-specific basis. For instance, system 100 and/or mobile computing device 102 may be configured to asynchronously and/or automatically generate different resolutions and/or compression formats for one or more, or all, supported operating systems and/or hardware devices. Object and/or platform combinations with a specific resolution of a 3D model that may be useful are identified by system 100 and/or mobile computing device 102. System 100 and/or mobile computing device 102 may identify which objects in a room type and/or application may be featured and/or may have higher resolution.

In one or more techniques, system 100 and/or mobile computing device 102 may be configured to recognize device capacity and adapt accordingly. For example, for a device and a virtual reality setting, system 100 and/or mobile computing device 102 may have a certain budget for 3D model memory, because of how many objects will be in the virtual reality setting and/or rendering capacity of the device. Remote computing device 118 and/or mobile computing device 102 can determine/identify what the mobile device's capacity may be and/or may serve/request the (e.g., correct, right, best) texture resolution based upon the capability of the mobile device. System 100 and/or mobile computing device 102 may be configured to allocate more memory for certain (e.g., more important) objects. The resolution (or other image rendering parameter) could also vary depending on the distance of the user's perspective from the objects in view.

In one or more techniques, system 100 and/or mobile computing device 102 may be configured to interface or integrate with other systems, including commerce systems and/or inventory management systems. Commerce systems and/or inventory management systems may define objects as "models" with "options." For instance, a rug might come in three sizes and/or three colors. In a commerce system and/or inventory management system, there may be a model ID and/or object ID for the rug itself, and/or a SKU for one or more, or each, variation of size and/or color. The model ID and/or object ID alone might be insufficient to provide the user with a rendering of one or more, or all, options of the object. In one or more techniques, system 100 and/or mobile computing device 102 may be configured to resolve one or more, or all, possible SKU options, and/or to render 3D models of one or more, or each, the object using one or more, or each, possible variation. In one or more techniques, system 100 and/or mobile computing device 102 may be configured to process 3D models in relation to one or more, or each SKU option, and/or may understand/comprehend/determine the relationship of the model ID and/or object ID to the SKU.

In one or more techniques, system 100 and/or mobile computing device 102 may be configured to use procedural modeling. For example, system 100 and/or mobile computing device 102 may be configured for cabinet doors by defining a 2D profile of the door and/or the rules for how to offset door and/or drawer style profiles from the face of a cabinet. System 100 and/or mobile computing device 102 may be configured to dynamically "stretch" the door parameters to fit one door to any cabinet size, for example, instead of modeling every door shape and/or size. For example, system 100 and/or mobile computing device 102 can be configured to do this for crown molding, shoe molding, countertops, countertop edge profiles, baseboards, ceiling structures, showers, and/or ceiling lights, and/or the like.

In one or more techniques, system 100 and/or mobile computing device 102 may be configured to render "assemblies," which are objects mounted on other objects and/or arranged into some kind of layout. For example, cabinets in a kitchen, a faucet on a vanity, and/or a lamp on a table are examples of assemblies. In one or more techniques, system 100 and/or mobile computing device 102 may be configured with the ability to pre-assemble objects into compound objects and/or assemblies and/or apply a specific price to the compound object and/or assembly. In one or more techniques, system 100 and/or mobile computing device 102 may be configured to allow for the use of rules and/or metadata defining fit, location, and/or compatibility, which may provide the ability to mount an object on another object. In one or more techniques, the rules and/or metadata for defining fit, location, and/or compatibility may be predetermined and/or may be directly loaded into the system 100 and/or mobile computing device 102 for use. In one or more techniques, the rules and/or metadata for defining fit, location, and/or compatibility may be determined at run-time. In one or more techniques, the rules and/or metadata for defining fit, location, and/or compatibility may be provided to the system 100 and/or mobile computing device 102 using predetermined information and/or information obtained at run-time. System 100 and/or mobile computing device 102 can be configured such that assemblies can be editable or not editable.

In one or more techniques, system 100 and/or mobile computing device 102 may be configured to allow for business rules for objects and/or assemblies that define what object and/or assembly can physically fit, where the object and/or assembly fits, how object and/or assembly is oriented, and/or whether the object and/or assembly can be changed. In one or more techniques, the business rules may be predetermined and/or may be directly loaded into the system 100 and/or mobile computing device 102 for use. In one or more techniques, the business rules may be determined at run-time. In one or more techniques, the business rules may be provided to the system 100 and/or mobile computing device 102 using predetermined information and/or information obtained at run-time.

For example, system 100 and/or mobile computing device 102 may be configured with an "object class" concept to define compatibility/fit between one or more objects. For example, a 3-hole faucet may fit (e.g., only) on a 3-hole vanity, and/or a sofa (e.g., only) rests on a floor, and/or a dishwasher may be (e.g., only) against a wall and/or under a countertop. Perhaps, for example, if a user attempts to place two virtual objects in the same virtual space, system 100 and/or mobile computing device 102 may be configured to determine the compatibility/fit between such objects and/or arrange them accordingly. For example, if a user attempts to place a virtual end table and a virtual lamp in the same virtual location, system 100 and/or mobile computing device 102 may be configured to arrange the virtual end table on the floor of the virtual space, and/or arrange the virtual lamp on top of the virtual end table. In addition system 100 and/or mobile computing device 102 may be configured to allow for various levels of specificity to determine fit.

Sometimes there may be (e.g., only) one specific object that can fit on another specific object. Other times there may be a larger set of objects that can fit together. as with physical compatibility, system 100 and/or mobile computing device 102 may be configured to allow for merchandising rules that may allow the content managers to set which categories and/or other object attributes are allowed to fit in a location. For example, system 100 and/or mobile computing device 102 may be configured such that the user can put any 3-hole faucet on a 3-hole vanity (e.g., using object class), but (e.g., only) Kohler® faucets may be allowed if the users want a specific price over a Labor Day Sale (e.g., using object manufacturer).

In one or more techniques, system 100 and/or mobile computing device 102 may be configured to allow for composition properties defining how an object can be composed in a scene. For example, regarding refrigerators, system 100 and/or mobile computing device 102 may be configured to require that refrigerators have to be mounted on a floor and/or against a wall, that refrigerators cannot be rotated, and/or that refrigerator doors can be rotated (e.g., only) about a specific anchoring point and/or within a specific arc.

In one or more techniques, system 100 and/or mobile computing device 102 may be configured to allow for composition properties that allow animations of objects for manipulating object parts, for example to show the inside and/or some range of motion. For example, regarding refrigerators, system 100 and/or mobile computing device 102 may be configured to allow animation to be data-driven and/or assigned for a class of objects vs. assigned to one or more, or each, specific 3D model. In one or more techniques, system 100 and/or mobile computing device 102 may be configured to allow objects to make sounds, and/or for lighting (e.g., lights, lamps, and/or ceiling fans) to have properties that allow control of angle, spread, and/or intensity.

Figure 4:
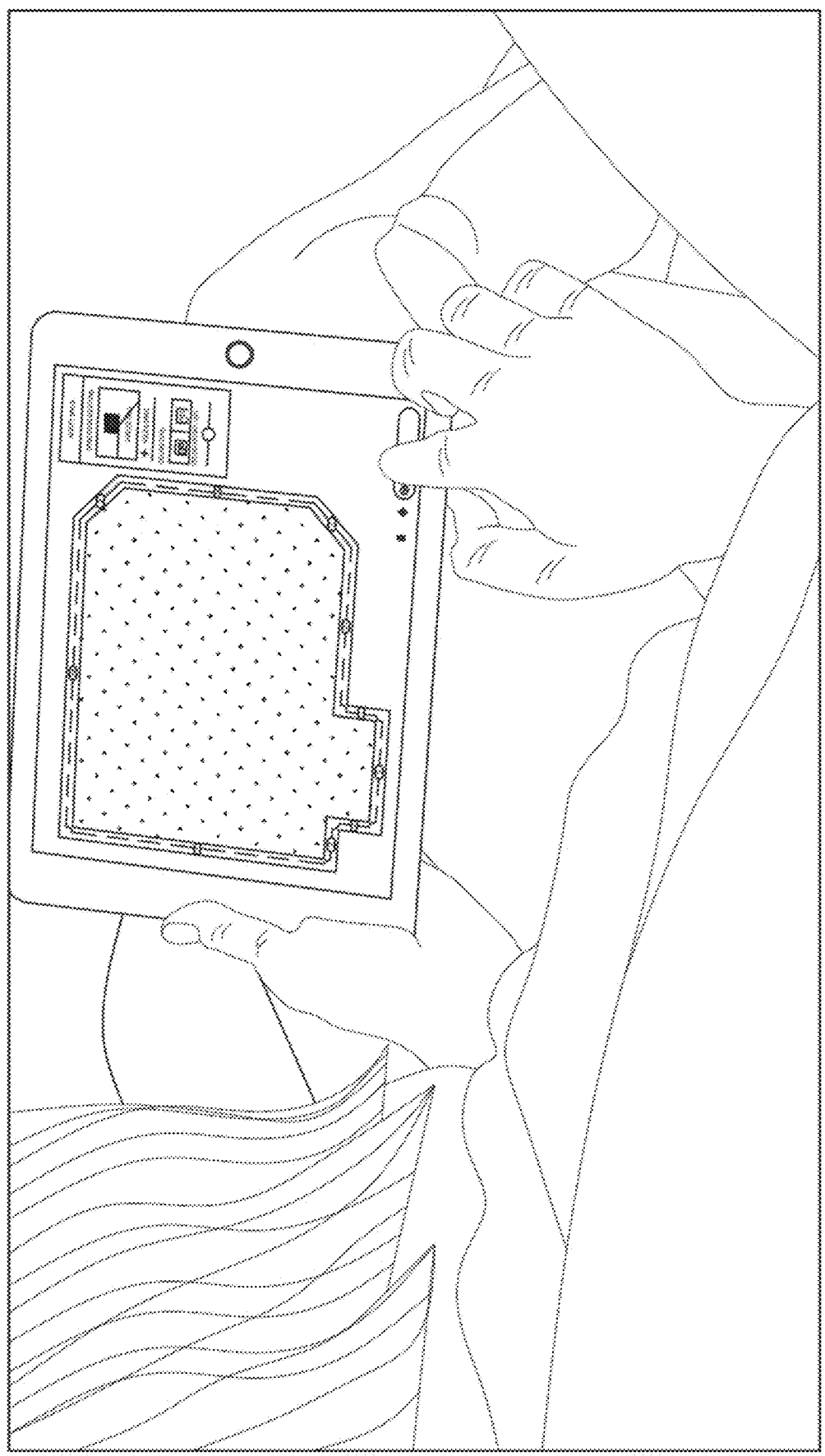
FIG. 4 shows an example technique of technology for composing a virtual or augmented reality setting in a mobile computing device environment, in accordance with one or more embodiments disclosed herein.

FIG. 4 shows an illustrative example of the use of system 100 and/or mobile computing device 102 for composing a virtual reality setting in a mobile computing environment, according to one or more techniques. For example, backgrounds, products, and other objects may be populated in the virtual environment through interaction with display 210 of mobile computing device 102 and application 114. Additional illustrations and functionality are provided with U.S. Pat. No. 10,600,255 and incorporated by reference herein.

Figure 5:
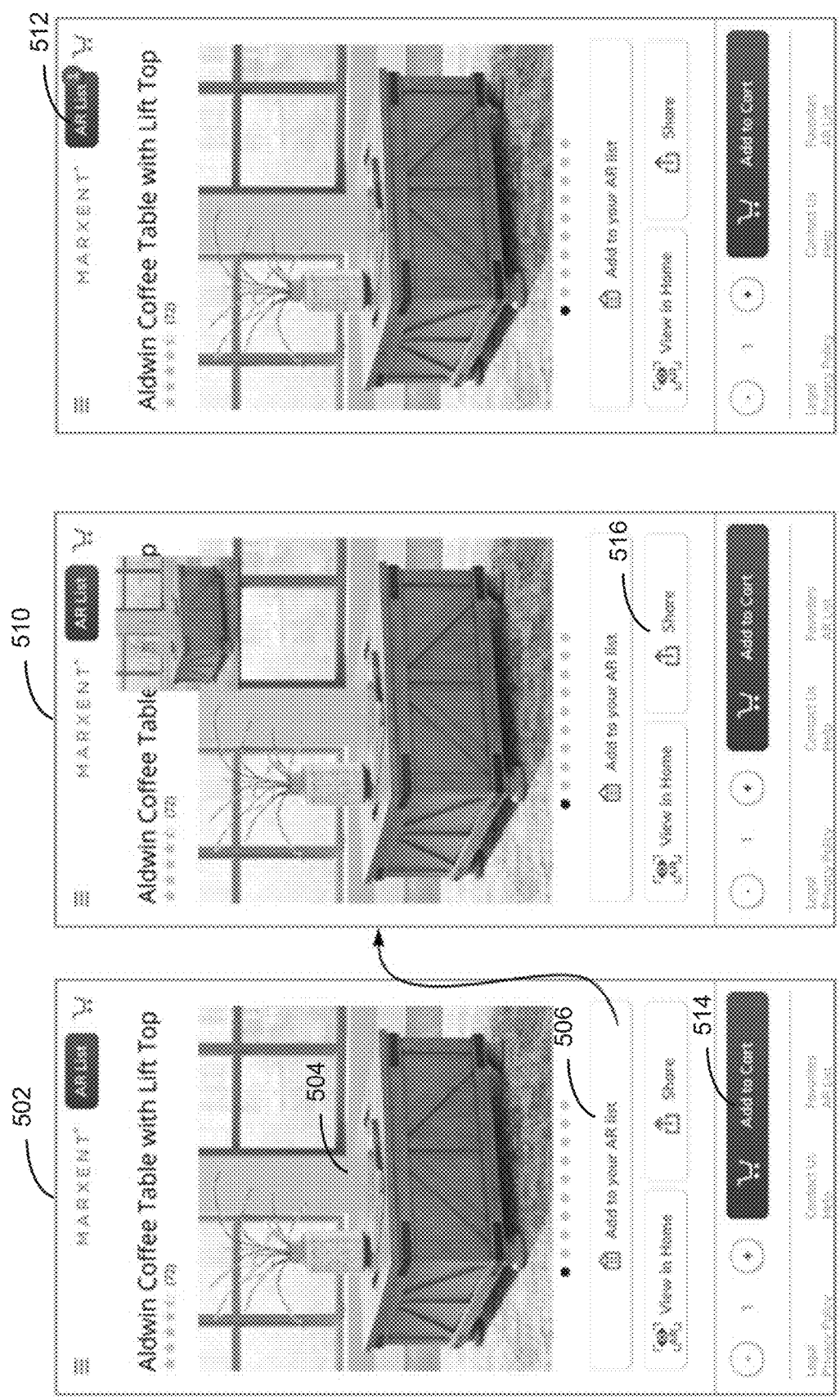
FIG. 5 illustrates user interfaces for enhancing product visualization, in accordance with one or more embodiments disclosed herein.

FIG. 5 illustrates user interfaces for enhancing product visualization in accordance with one or more embodiments disclosed herein. Mobile computing device 102 may display a web page 502 that includes one or more AR-enabled images of products 504 (e.g., room décor, furniture, or other products).

Application 114 of mobile computing device 102 may interface with the user (e.g., via a touchscreen display) to allow the user to select the product 504 and/or add the product to their list using a "add to AR list" (or similarly labeled) tool 506. Similarly, on web page 510, the user may select and drag the image of the product to the tool 506. The "add to AR list" (or similarly labeled) tool 506 may be updated with a "badge" or identifier 512 illustrating a number of products or other AR-enabled images that have been associated with the user. The identifier 512 can appear over tool 506 to display the number of products in the list of AR-enabled images.

The "add to AR list" tool 506 may include a dynamically generated user interface element that is incorporated with a webpage at mobile computing device 102. The "add to AR list" tool 506 may be activated or triggered when the product selected has a corresponding AR-enabled image.

The "add to AR list" tool 506 provides a number of benefits. For example, if a user is searching for products when they are using a desktop computer or are not in the room for which they are shopping, they can easily save to the list of AR-enabled product images that they find. The "add to AR list" tool 506 provides a convenient way to create a place where products available in AR are stored in one place to enable an easy way to view and compare products and display them in the user's room when they are located there.

According to some embodiments of the disclosure, a user may save AR-enabled images of products to a list using the "add to AR list" tool 506. For example, the user may generate the AR list while searching for products on a desktop, and then later transfer the list of AR-enabled images to a mobile device (e.g., when the user is in the room for which they are shopping or at other times).

The images provided in web pages 502, 510, or 512 may (or may not) be pre-processed to identify products in the image. The system may store a product identifier (e.g., which can be a system-generated identifier for locating a locally stored product in local resource database 106, or a specific manufacturer identifier, retailer identifier, etc.). Other information may be stored in association with the product identifier, including for example, price, product variations (e.g., color, size, finish, etc.), availability (in-store or online), the AR-enabled images associated with the product, and the like.

The product identifier may reference a 3D model (e.g., a piece of furniture) and/or more than one 3D model (e.g., a set of furniture). In other words, more than one 3D model can be selected for rendering in the virtual environment at any given time. In one or more techniques, for example in which more than one 3D model may be referenced, one or more, or each, 3D model may be considered an individual 3D model and/or positioned/orientated as an individual 3D model relative to the other 3D models, and/or may be treated as a group of 3D models positioned/oriented together.

Subsequent to the selection of the 3D model(s) to be rendered, mobile computing device 102 may be configured to determine where the 3D model(s) to be rendered are stored, e.g., in local resource database 106 and/or master resource database 122. One or more, or each, 3D model may be packaged into a binary resource that includes its rendering components, as well as any physics information, audio information, rules, metadata, and/or any other overhead. Some or all contents of the local resource database 106 and/or the master resource database 122 may be updated and/or expanded continuously in real-time, periodically, and/or on-demand, for example, via an Internet-based cloud connection, and/or the like (e.g., from the manufacturer, retailer, etc.).

Web pages 502, 510, or 512 may also include an "add to cart" tool 514 and a share tool 516. "Add to cart" tool 514 may enable the user to add the product 504 to a virtual shopping cart so the user can purchase the selected product. When the photo and/or one or more products from the photo are in an AR-enabled view and/or virtual room planner view, resource manager 104 can automatically add the product to an online shopping cart or manually add to the cart (via "add to cart" tool 514). Once one or more products are added to the cart, the user can purchase the items from the cart (e.g., via an electronic wallet or other payment processes, etc.).

According to another feature, the system can identify additional products a user may want or need—e.g., brackets for mounting or other ancillary items needed for use with the products. For example, the product identifier may be linked with related product identifiers (e.g., via a tag or shared category) in local resource database 106 or master resource database 122. The product added to the cart may be a main or first product (used interchangeably), and any additional products may be secondary or support products. In some examples, when the main product is added to the cart, the system may determine the tag associated with the main product and search for any other products that share the same tag (e.g., mounting brackets, etc.). If any secondary products are found, the system may determine whether or not the products are in the cart and, if not, may automatically add them to the cart according to their product identifier. In some examples, the system may also add a notification message to identify the additional products that were automatically added.

Share tool 516 may enable the user to share the product image with others. For example, a copy of the image of the product 504 may be saved to a clipboard and pasted to a second application (e.g., social media, email, text messaging, etc.).

In some examples, web pages 502, 510, or 512 may also include a menu option to select other displays/features. The menu can include features to enable the user to add one or more products (e.g., 3D models of the products) to a virtual room planner.

Figure 6:
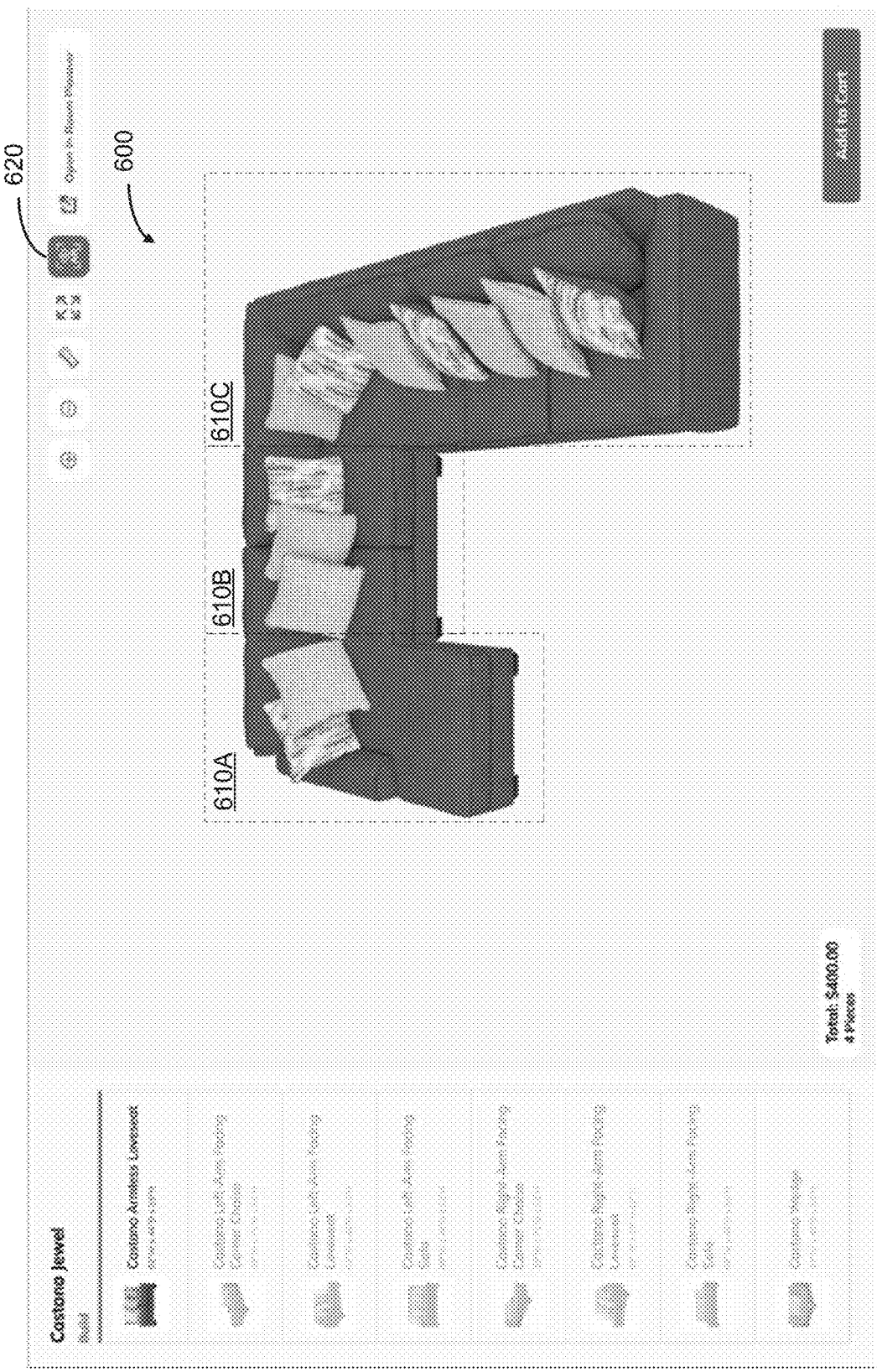
FIG. 6 illustrates multiple components of a product, in accordance with one or more embodiments disclosed herein.

In some examples, the product may correspond with a set of components, as illustrated in FIG. 6. In this illustration, product 600 corresponds with a first component 610A, second component 610B, and third component 610C. The set of components 610 can correspond with multiple product identifiers or other information, described herein, that may be stored as a set of data in the data store. When viewing the set of components 610 corresponding with a single product 600, other application functionality is available as well, including view in AR 620 or other features described herein.

Figure 7:
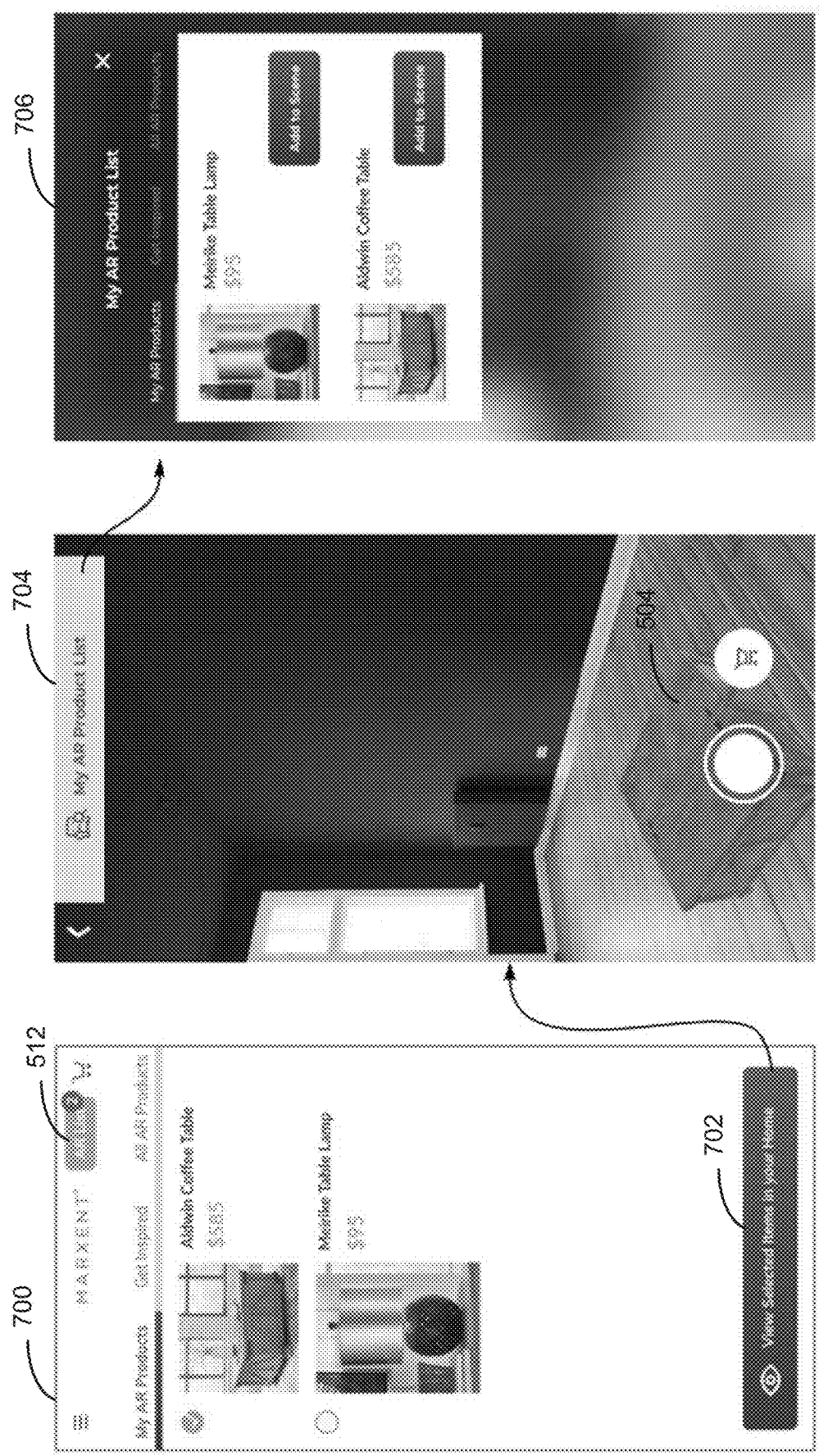
FIG. 7 illustrates user interfaces for accessing the add to AR list tool and placing the product in a virtual environment, in accordance with one or more embodiments disclosed herein.

FIG. 7 illustrates user interfaces for accessing the add to AR list tool and placing the item in a virtual environment, in accordance with one or more embodiments disclosed herein. At web page 700, one or more products may be aggregated into a common data store or list. The list of AR-enabled images of products may be provided to a product display area (e.g., which enables a user to select to see a single page with the user's selection of products for which the user has selected to add to the user's saved AR list).

The products may originate from different webpage sources and may be saved to the AR list associated with the user. For example, once the item is selected and added to the AR list using the "add to AR list" tool 506, the user may activate the tool and select one or more products to see depicted in an AR-enabled image using a "view in AR room" tool 702. The "view in AR room" (or similarly labeled) tool 702 may indicate one or more product images that are AR-enabled images available to place in an AR-enabled environment associated with the user's physical environment.

The products may originate from other sources as well. For example, the system may include one or more product catalogs stored online, at least some of which have corresponding AR-enabled images and at least some of which may be 3D model-enabled and a 3D room design functionality. The user may search for products from the catalog and view products for which AR-enabled images are available in an AR-enabled environment associated with the user's physical environment.

In some examples, the selected product 504 illustrated in FIG. 5 or set of components corresponding with a combined product 600 illustrated in FIG. 6 (and used interchangeably throughout the disclosure) may be incorporated with other features of the browser application 114 to integrate the AR-enabled view features and the 3D room planner features. For example, if a user selects a product to add to the list of AR-enabled images, the same product can automatically be added to a favorite products page in the room planner module or similar application. This may add product 504 to the list of AR-enabled images displayed at webpage 706.

The "view in AR room" tool 702 may be activated when one or more products have been added to the user's list of AR-enabled images (e.g., associating a user identifier, product identifier, and a value of products greater than zero in the AR list, etc.). By dynamically showing the "view in AR room" display option when the product selected has a corresponding AR-enabled image, the user can access an AR-enabled view of the product 504 in a physical environment.

At web page 704, product 504 is added to the virtual environment after selecting the "view in AR room" tool 702 (e.g., using "AR mode"). For example, the user may select a 2D image portraying product 504 and the application may determine one or more visible properties of product 504, including the fabric color, texture, dimensions, etc. or features of the AR-enabled environment, including wall color, floor color, floor covering, ceiling color, and/or ceiling covering, and/or the like.

In some examples, resource manager 104 transmits a 3D model of product 504 to rendering platform 108 such that rendering engine 112 of rendering platform 108 can render the object as a function of the 3D model received from resource manager 104. If resource manager 104 determines that a 3D model is not stored in local resource database 106, resource manager 104 may transmit a request to a master resource database at a remote computing device (e.g., master resource database 122 of remote computing device 118) requesting the missing 3D model. The request may be usable by resource manager 120 of remote computing device 118 to determine which 3D model is being requested and return the requested 3D model to resource manager 104 of local computing device 102. Resource manager 104 may store the 3D model received from remote computing device 118 to the local resource database 106. Resource manager 104 may transmit the 3D model to rendering platform 108 such that rendering engine 112 of rendering platform 108 can render the object as a function of the 3D model received from resource manager 104.

In one or more scenarios, product 504 may be placed in the environment displayed at web page 704 with a starting element that forms the anchor for rendering the grouping of products in the 3D virtual environment. For example, a table can be placed on top of a starting element corresponding with a floor.

In one or more scenarios, the starting element may be predefined based on one or more priority values that may be assigned to one or more, or each, element within the list of AR-enabled images of products. The highest priority element within the selected group may be taken as the starting element for the placement rules, as executed by the processor of the computing device. In one or more scenarios, user selection may be used to allow the user to specify the priority of placement. In one or more scenarios, the selected elements may be processed at runtime against a set of rules, for example to determine placement priority. For example, a rule set may specify that tables have higher placement priority over lamps. The selected elements from the 2D image may be sorted such that one or more, or all, tables may be placed before any lamps are placed, for example.

As an illustrative example, the "view in AR room" tool 702 may be associated with a user's home. By selecting tool 702, the image of the product may be placed in a virtual environment associated with the user's home. This may enable the user to select to display an AR-enabled view of the selected product in a room in which the user is located at the time.

Web page 704 may illustrate the AR mode. If a user views a room (e.g., while viewing an AR-enabled image of product 504 in the room), the application can also scan the room for configuration, dimensions, structural features (e.g., doors, windows and/or other features), and other room elements. The room information from the AR scan can be used to generate at least an outline or a more detailed layout of the room for use in the 3D room planner.

In one or more scenarios, the layout, extents, and/or dimensions of the 3D virtual environment may be obtained from an existing database of floorplans and/or building templates. In one or more scenarios, the layout and/or dimensions of the 3D virtual environment may be analyzed by the local computing device 102 and/or remote computing device. Additional layout information may be stored for the 3D virtual environment. For example, the 3D virtual environment may be analyzed and/or categorized, for example, according to shape (e.g., G shaped, L shaped, and/or T shaped). In one or more scenarios, the 3D virtual environment may be (e.g., automatically) created and/or modified using one or more placement rules, executed by the processor, to construct one or more 3D environmental components that may include including but not limited to walkways, ventilation, stairs, windows, and/or doorways, etc.

In one or more scenarios, the computing devices described herein may execute machine-readable instructions to perform the operations described herein, including constructing the aforementioned components specifying the generation criteria. For example, the rule set used for procedurally generating doors may include one or more rules specifying that door frames may (e.g., may only) be placed on walls of at least 36" in width and/or 7' of height. The rule set may specify that the door frames might not be placed such that an open door may intersect with another wall on either side of the door frame. In other words, the door frame may (e.g., may only) be placed in locations where the door may be fully opened. For example, the procedural algorithm for the creation of stairs may utilize one or rule sets specifying that the height of one or more, or each, the step might not exceed 10" and/or may be at least 7", and/or that one or more, or each, step may be (e.g., must be) at least 10" wide. The procedural algorithm may not proceed, perhaps, for example, if the creation may violate any generation rules. In one or more scenarios, the generation rules may be dynamically set and/or switched at application run time, may be provided by an external source, such as by uploading a file containing formatted rules, and/or may be provided through the resource database 106, among others, for example.

In one or more scenarios, the 2D image may be provided as at least a part of a presorted selection of one or more images stored in the local resource database 106. In one or more scenarios, the 2D image may be selected from an assortment supplied by an external resource database and/or web service. For example, the 2D image may be selected from a trending list of room arrangements provided by a social media website. In one or more scenarios, the selected 2D image of the desired layout may be processed by image analyzer 110 to extract arrangement and/or decor styling information, for example, to guide the (e.g., automatic) selection and/or placement of 3D models within the 3D virtual environment(s). For example, image analyzer 110 may extract wall color and/or may identify floor covering material from a 2D image that may be uploaded by the user.

In one or more scenarios, the image analyzer may utilize existing computer vision and/or machine learning algorithms to identify the floor, walls, and/or other items of interest and/or may sample the color and/or patterns visible on one or more, or each, object.

In one or more scenarios, the image analyzer may process the selected 2D image and/or may identify one or more types of objects, for example with regard to basic function(s), and/or their relative arrangement within the 2D image. The image analyzer may utilize one or more existing machine learning algorithms for performing the aforementioned techniques.

In one or more scenarios, the extracted object identifiers may be used to guide the identification and/or selection of similarly functional products available within the local resource database 106. For example, the image analyzer may process a 2D image selected by the user and/or may identify a reclining chair in the image by a window. This information may provide a list of available reclining chairs (e.g., products) within the local resource database 106, for example, with suggestions and/or (e.g., automatic) placement of a most closely resembling product next to a window within the 3D virtual environment.

The user may interact with the touchscreen display of mobile computing device 102 capable of receiving user input via touch (e.g., one or more fingers, a stylus, etc.) to move the product 504 to a different location in the virtual environment. Web page 704 may update the visual display of the product 504 moving around the virtual environment.

At webpage 706, one or more AR-enabled images of products may be added to the same virtual environment that includes product 504. The products may originate from different web pages but may be saved to a common data store associated with the user. The products may be selected from a list of AR-enabled images of products (illustrated at webpage 706) to view a set of user-selected AR-enabled images on a single view and, when in a room, selectively display an AR-enabled image of the corresponding products in the room.

Figure 8:
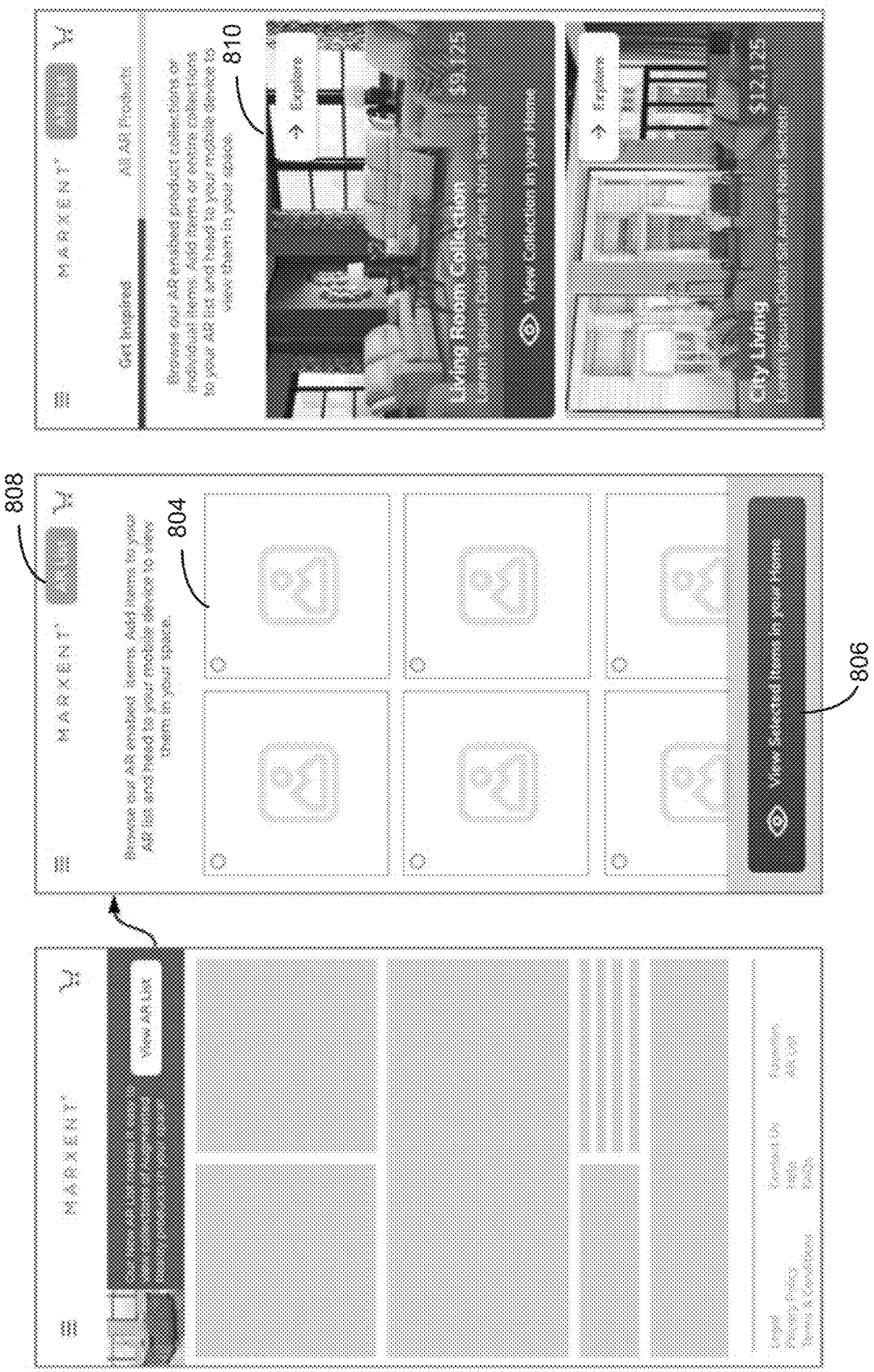
FIG. 8 illustrates various interfaces for displaying AR-enabled images of products, in accordance with one or more embodiments disclosed herein.

FIG. 8 illustrates various interfaces for displaying AR-enabled images of products, in accordance with one or more embodiments disclosed herein. The one or more AR-enabled images of products may be hosted on a cloud-based platform that includes one or more product catalog for entities (e.g., a retailer, etc.). The product catalog may be viewable via one or more product display pages, like web page 502 in FIG. 5.

An illustrative product catalog 804 is provided, where the product catalog may be searchable via web-based search functions. The user interface for the product display pages and/or search results pages may include a set of display elements that provide the user interface functionality described herein, including a "view in AR room" (or similarly labeled) icon 806 that indicates the product images that are AR-enabled images and that further includes another icon on the user interface that is a "add to AR list" (or similarly labeled) icon 808 that enables users to save a list of AR-enabled images of products.

In some examples, an inspiration image 810 may be received (e.g., from mobile computing device 102, from the stored images in the master resource database 122, etc.) and one or more products may be identified in the image. The products may be manually added via the "add to AR list" tool 506 or may be automatically added (e.g., once the inspiration image is received, etc.). The products in the inspiration image may be identified as having a corresponding AR-enabled image. Additional information associated with the inspiration image is provided with FIG. 17.

In some examples, the features described herein may be applicable to photos of a single product or multiple products. For example, the system may include a photo-to-floor plan feature whereby a user may view a photo of multiple products arranged in a predetermined layout within a room. The system may be preconfigured to enable individual ones of the multiple products in the photo to have a corresponding AR-enabled image of the product. Alternatively, or in addition, a set of some or all of the multiple products in the photo may have a corresponding AR-enabled image of the set of products.

In some examples, the system may be preconfigured to enable individual ones of the multiple products in the photo to have a corresponding 3D model of the product. The individual or set of products can be displayed in an AR-enabled view in the room. Alternatively, or in addition, a set of some or all of the multiple products in the photo may have a corresponding 3D model of the set of products. The 3D model(s) of the individual or set of products can be displayed in a virtual room planner.

Figure 9:
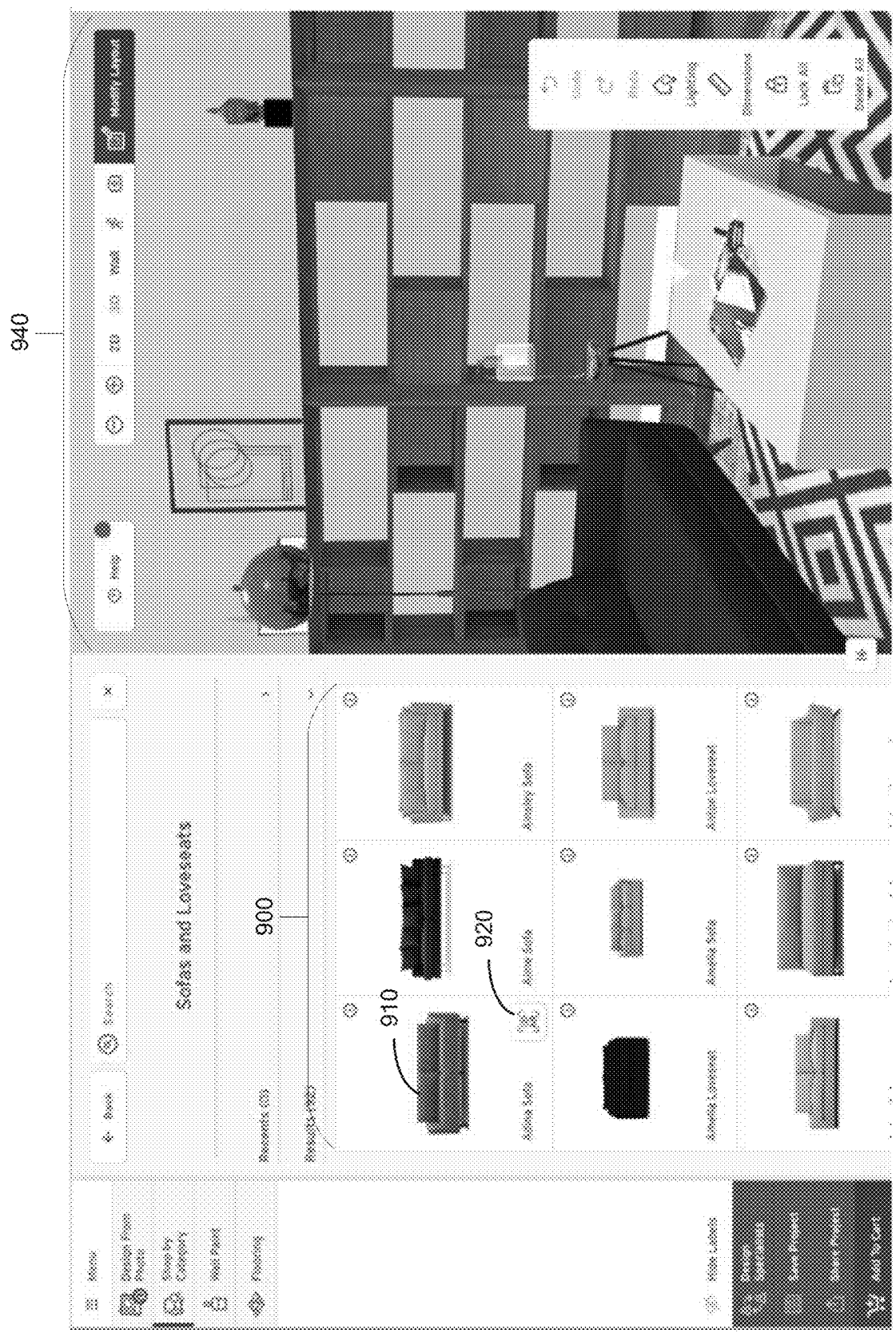
FIG. 9 illustrates a product catalog of AR-enabled images of products in accordance with one or more embodiments disclosed herein.

FIG. 9 illustrates a product catalog of AR-enabled images of products in accordance with one or more embodiments disclosed herein. In this example, one or more AR-enabled images of products 910 is provided in a product catalog 900 layout. The user may select any of the products listed in product catalog 900 and the image of the product may be placed in a virtual environment 940. In this example, product catalog 900 and virtual environment 940 are displayed concurrently, although other implementations of the interface are possible as well. When the user selects a second product, the second product may replace the first product 910 and the virtual environment 940.

The product catalog 900 may also provide access to AR-enabled images of the products. The user may interact with the product catalog 900 to activate the "view in AR room" tool 920. Upon selection, a QR code or other tool may appear. The QR code may be associated with a link to the selected product (e.g., within the box surrounding the product 910 and the tool 920). The user may scan the QR code, as further illustrated with FIGS. 14-16.

Figure 10:
FIG. 10 illustrates a virtual environment with selectable AR-enabled images of products in accordance with one or more embodiments disclosed herein.

FIG. 10 illustrates a virtual environment with selectable AR-enabled images of products in accordance with one or more embodiments disclosed herein. In this example, one or more AR-enabled images of products may be selected, as illustrated with product 1010. Product 1010, along with other products shown in the virtual environment, may be associated with AR-enabled images of the product.

Upon selection, the user may interact with the product, including rotating, duplicating, or replacing the product with another product from the product catalog. In some examples, the user may select a "view in AR room" tool 1020. Upon selection, a QR code or other tool may appear. The QR code may be associated with a link to the selected product. The user may scan the QR code, as further illustrated with FIGS. 14-16.

Figure 11:
FIG. 11 illustrates a virtual environment with selectable AR-enabled images of products in accordance with one or more embodiments disclosed herein.

FIG. 11 illustrates a virtual environment with selectable AR-enabled images of products in accordance with one or more embodiments disclosed herein. In this example, a set of products 1110 may be selected, including first product 1110A, second product 1110B, and third product 1110C. Each product in the set of products 1110 may be associated with AR-enabled images of the product, corresponding with three sets of AR-enabled images of the product. Other embodiments may adjust the AR-enabled images of the product (e.g., a single product may be stored with AR-enabled images of the product rather than all three products) without diverting form the essence of the disclosure.

Upon selection, the user may interact with any of the set of products 1110, including rotating, duplicating, or replacing the product with another product from the product catalog. The products may be interacted with individually or in combination. In some examples, the user may select a "view in AR room" tool 1120. Upon selection, a QR code or other tool may appear. The QR code may be associated with a link to the selected products. The user may scan the QR code, as further illustrated with FIGS. 14-16.

Figure 12:
FIG. 12 illustrates a data store of AR-enabled images of products, in accordance with one or more embodiments disclosed herein.

FIG. 12 illustrates a data store of AR-enabled images of products in accordance with one or more embodiments disclosed herein. As illustrated, one or more products 1200 may be displayed (illustrated as first product 1200A, second product 1100B, third product 1200C, fourth product 1200D, and fifth product 1200E). One or more products 1200 may be stored with a product catalog.

Any one or more of the products 1200 may be interacted with at the user interface. For example, the user may select first product 1200A and second product 1200B as products to add to a favorite list. The selected products may correspond with a "heart" icon or other similar label 1210 (illustrated as first icon 1210A and second icon 1210B). The products in the favorite list may be accessible throughout the application and may or may not be associated with AR-enabled images of the product.

In another example, the user may select fourth product 1200D and fifth product 1200E as products to add to AR list 1240. The selected products may be identified by selecting an "add to AR list" (or similarly labeled) icon (illustrated as first icon 1220A and second icon 1220B). Upon selection, the AR-enabled images of product may be added to AR list 1240.

Figure 13:
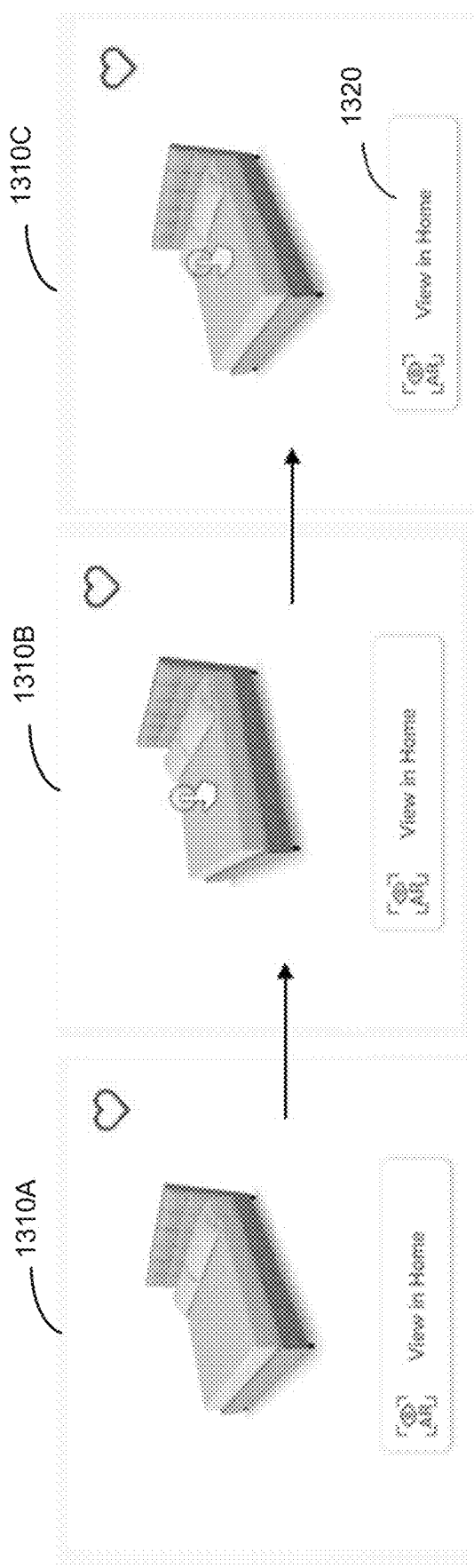
FIG. 13 illustrates an animated AR-enabled image of a product, in accordance with one or more embodiments disclosed herein.

One or more of the products may be animated, as shown in FIG. 13, irrespective of whether the product is selected. FIG. 13 illustrates an animated AR-enabled images of a product in accordance with one or more embodiments disclosed herein. For example, the AR-enabled images of a product may be shown in a progression of animated perspectives 1310 (illustrated as first animated perspective 1310A, second animated perspective 1310B, and third animated perspective 1310C). The animated product may show different angles of the stored 3D model of the product, which provides an automated rotation of the image to show the different perspectives.

In some examples, the user may interact with the animated product as shown in second position 1310B. In this example, the user may interact with the interface of mobile computing device 102 and slide the image of the product to the left or right in order to view the left or right sides of the product, respectively. When the user interacts with the interface of mobile computing device 102 to slide the image of the product up and down, the presented image of the product may show the top and underside of product, respectively. When the user stops interacting with the interface, the product may return to the automated rotation of the image.

Figure 14:
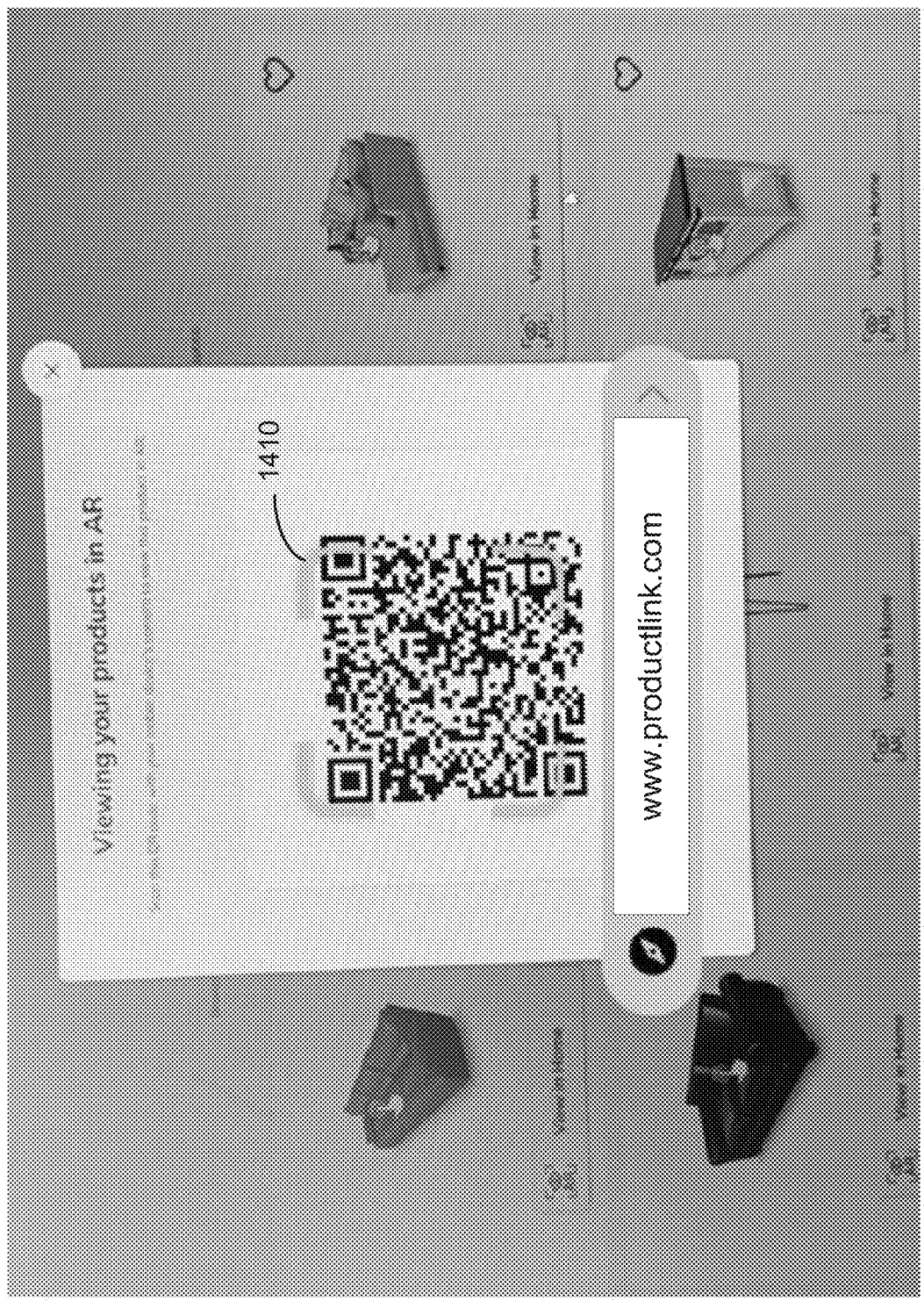
FIG. 14 illustrates a QR code to enable handoff to a mobile device, in accordance with one or more embodiments disclosed herein.
Figure 15:
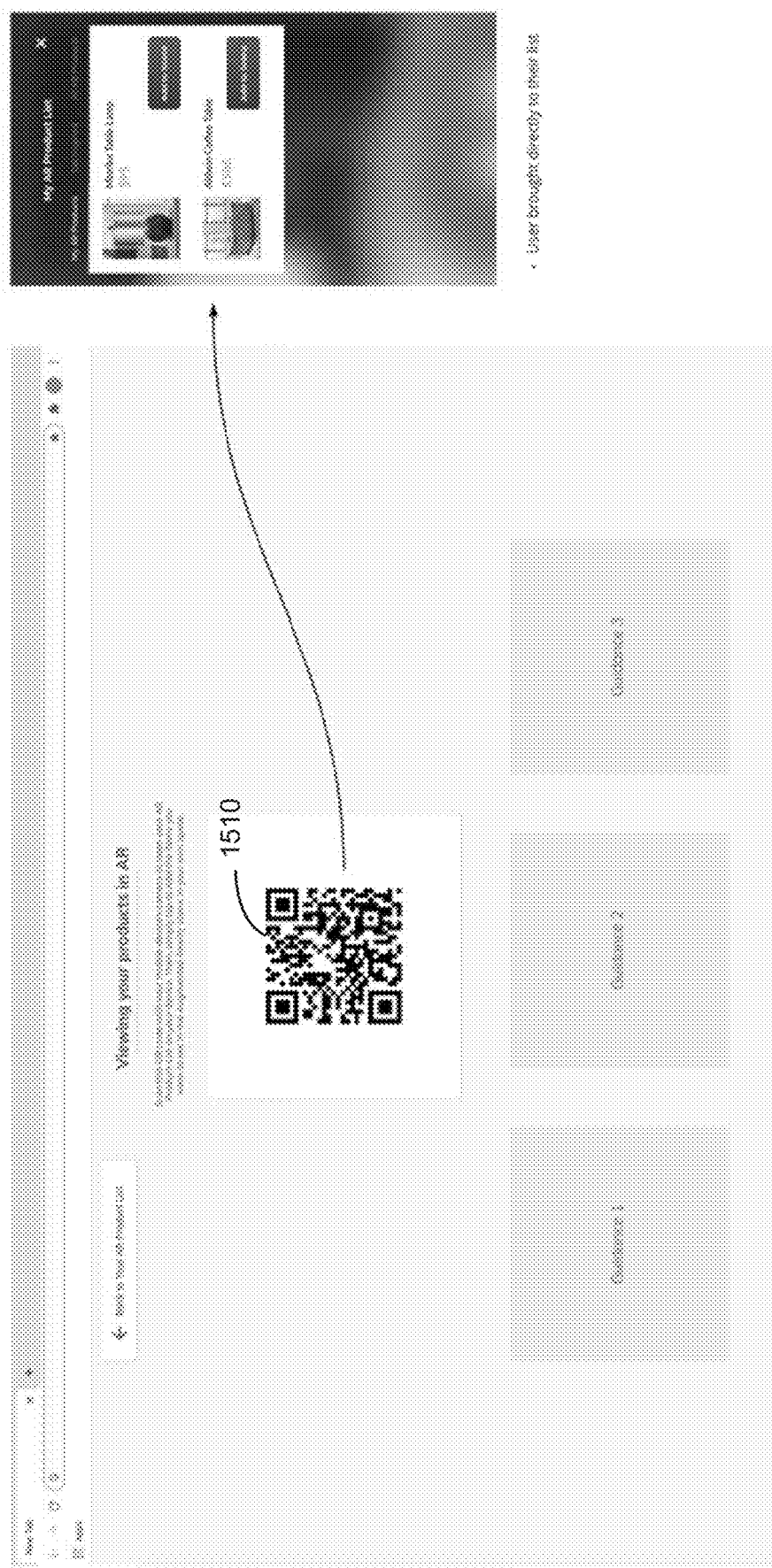
FIG. 15 illustrates a QR code to activate a link in a web browser, in accordance with one or more embodiments disclosed herein.
Figure 16:
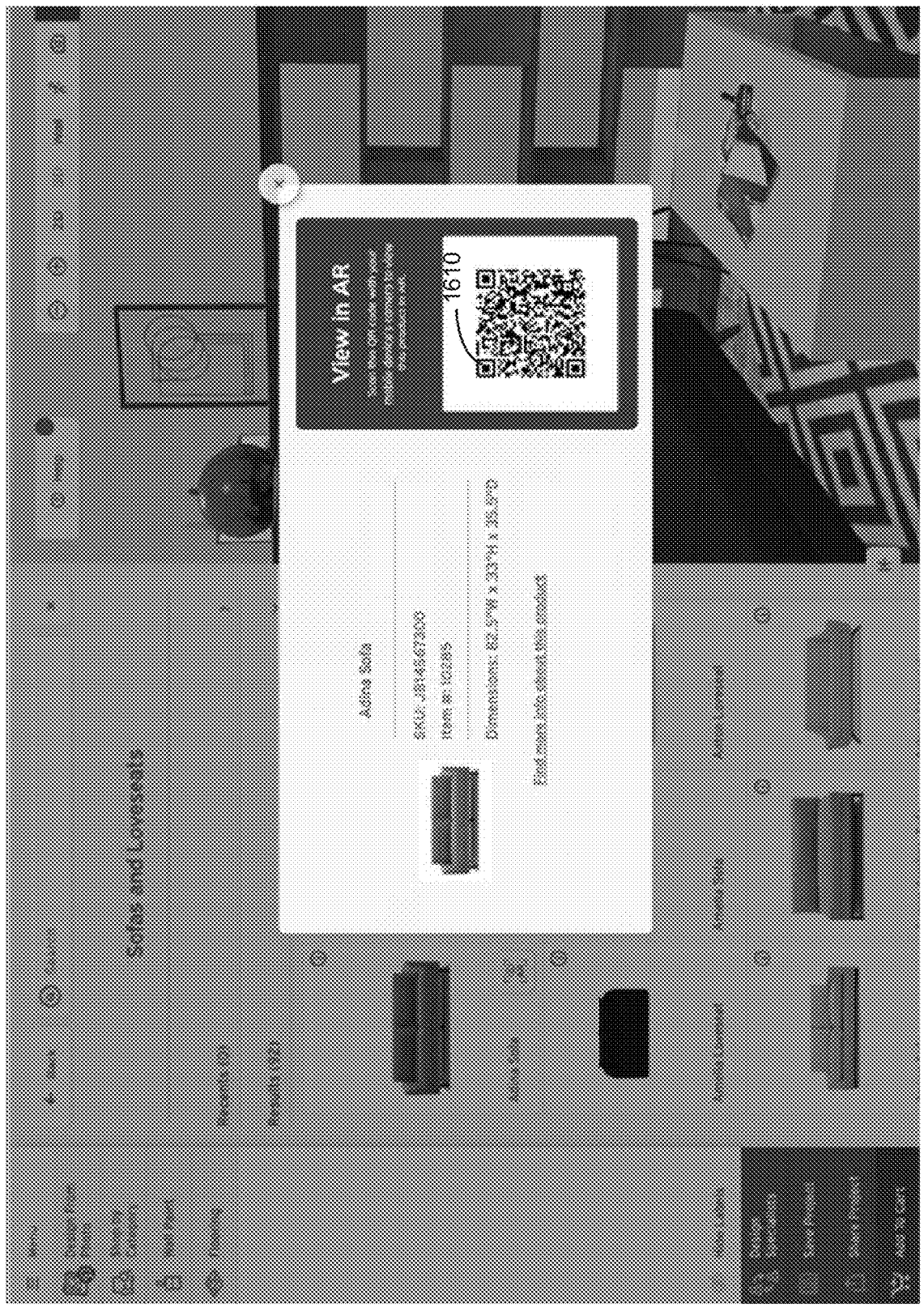
FIG. 16 illustrates a QR code provided concurrently with product information in an overlay, in accordance with one or more embodiments disclosed herein.

When "view in AR room" tool 1320 is activated, a QR code may be provided to the interface of a computing device, as illustrated in FIGS. 14-16. For example, as illustrated in FIG. 14, a QR code 1410 may be presented at the interface of the first device to enable handoff from the first device to a second device. The second device (e.g., mobile computing device 102) may be operated to digitally scan and/or capture an image of the QR code 1410 with a camera integrated with the second device. The second device may identify the QR code 1410, determine a link associated with the QR code 1410, and open the link in application 114 of the second device.

In another example, as illustrated in FIG. 15, a QR code 1510 may be presented at the interface of the computing device. The user may interact with (e.g., tap, select, click, etc.) the QR code 1510 to activate the link associated with the QR code 1510. Once the link is activated, the computing device may open the link in a web browser or other software application (e.g., application 114).

In yet another example, illustrated in FIG. 16, a QR code 1610 may be presented at the interface of the computing device as an overlay or adjacent to product information. The QR code may be provided concurrently with product information in the overlay. The user may interact with (e.g., tap, select, click, etc.) the QR code 1610 to activate the link associated with the QR code 1610. Once the link is activated, the computing device may open the link in a web browser or other software application (e.g., application 114).

In any of the examples illustrated in FIGS. 14-16, upon scanning or activating the QR code, application 114 may be launched at mobile computing device 102 to allow the user to browse for products and visualize them in an AR-enabled environment. Application 114 can display a list of AR-enabled images of products on mobile computing device 102. In some examples, application 114 may be pre-populated with an existing list of products or default products associated with the QR code. In other examples, application 114 may be launched at mobile computing device 102 with one or more products cached with the application for quicker visualization in the AR-enabled environment. The user may select one or more products from the displayed list of products to view the selected products individually and/or in groups in an AR-enabled view in the user's room.

In other examples, application 114 may display the list of AR-enabled images of products and products on the same user interface. The user may save one or more AR-enabled images of products using the "add to AR list" feature while searching for products on a desktop and then later transfer the list/images locally to mobile computing device 102 in the local resource database 106 (e.g. when the user is in the room for which they are shopping or at other times).

The "add to AR list" display element provides a number of benefits. For example, if a user is searching for products when they are using a desktop computer or are not in the room for which they shopping, they can easily add to the list the product images of interest that they find and, when in the room, selectively display an AR-enabled view of the saved products in the room.

The "add to AR list" feature provides a convenient way to create a place where products available in AR are stored in one place to enable an easy way to view and compare products and display them in the user's room when they are located there.

Figure 17:
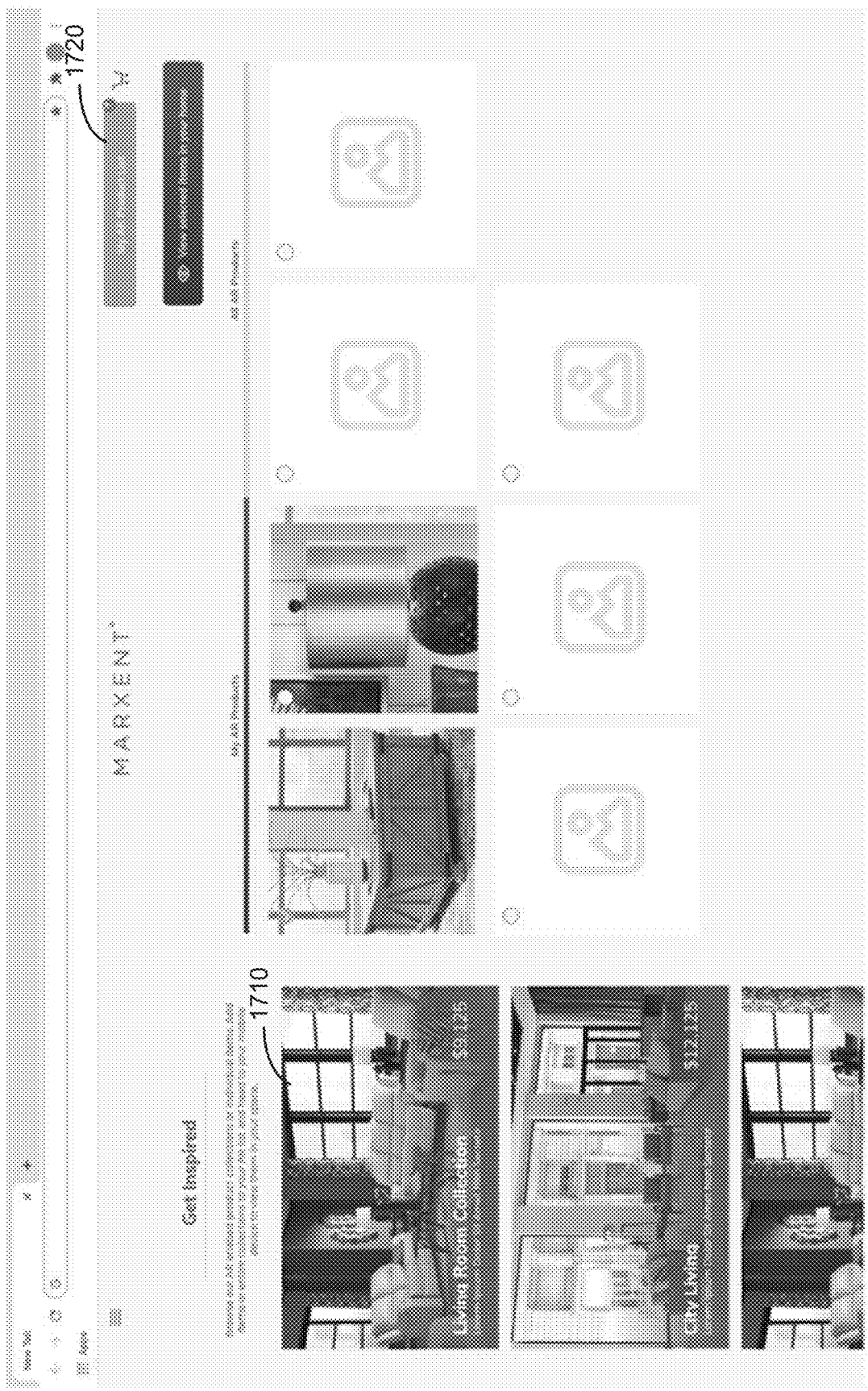
FIG. 17 illustrates product and inspiration images saved to a user profile, in accordance with one or more embodiments disclosed herein.

FIG. 17 illustrates product and inspiration images saved to a user profile, in accordance with one or more embodiments disclosed herein. In this illustration, a set of inspiration images 1710 is provided at a user interface, where products, colors (of the cabinets, flooring, furniture/products, walls, etc.), layout (of the structure of the room including windows or doors, placement of products with respect to the structure of the room, the mixture of colors/patterns within the room, etc.), design intent (of mixing colors, patterns, or types of furniture that is most closely related to a known design style stored in a data store, etc.), or other features of the room may be identified in the inspiration image.

In some examples, the AR list link 1720 may be incorporated with the set of inspiration images 1710 on the same user interface. The products from the AR list link 1720 may be incorporated with products included in each inspiration image.

At least some of the components of the inspiration image 1710 may be identified by an image analysis algorithm. For example, the image analysis algorithm can identify outlines of products in the image by identifying similar lines, textures, or other image qualities and attributing the similar pixels with stored images of room features or products (e.g., walls, floors, windows, couches, seats, curtains, etc.). The image analysis algorithm may match the identified products and colors in the inspiration image with a stored inspiration image. When a match is determined (e.g., based on a match score comparing the received and stored images), the stored inspiration image with the highest match rate may be identified to retrieve additional information and metadata about the received inspiration image.

In some examples, the products in the inspiration image 1710 (and AR list 1720, if they are selected) may be placed in the user's AR-room in accordance with the rules corresponding with a room layout (e.g., an L-shape, G-shape, T-shape, and the like). The user interface may be updated to display potential room layouts that the user can select and may also identify the products that have AR-enabled images corresponding with them. In this manner, the user interface may visualize the AR-enabled images of the products as well as the placement of the AR-enabled images of the products in a layout that corresponds with the inspiration image.

Figure 18:
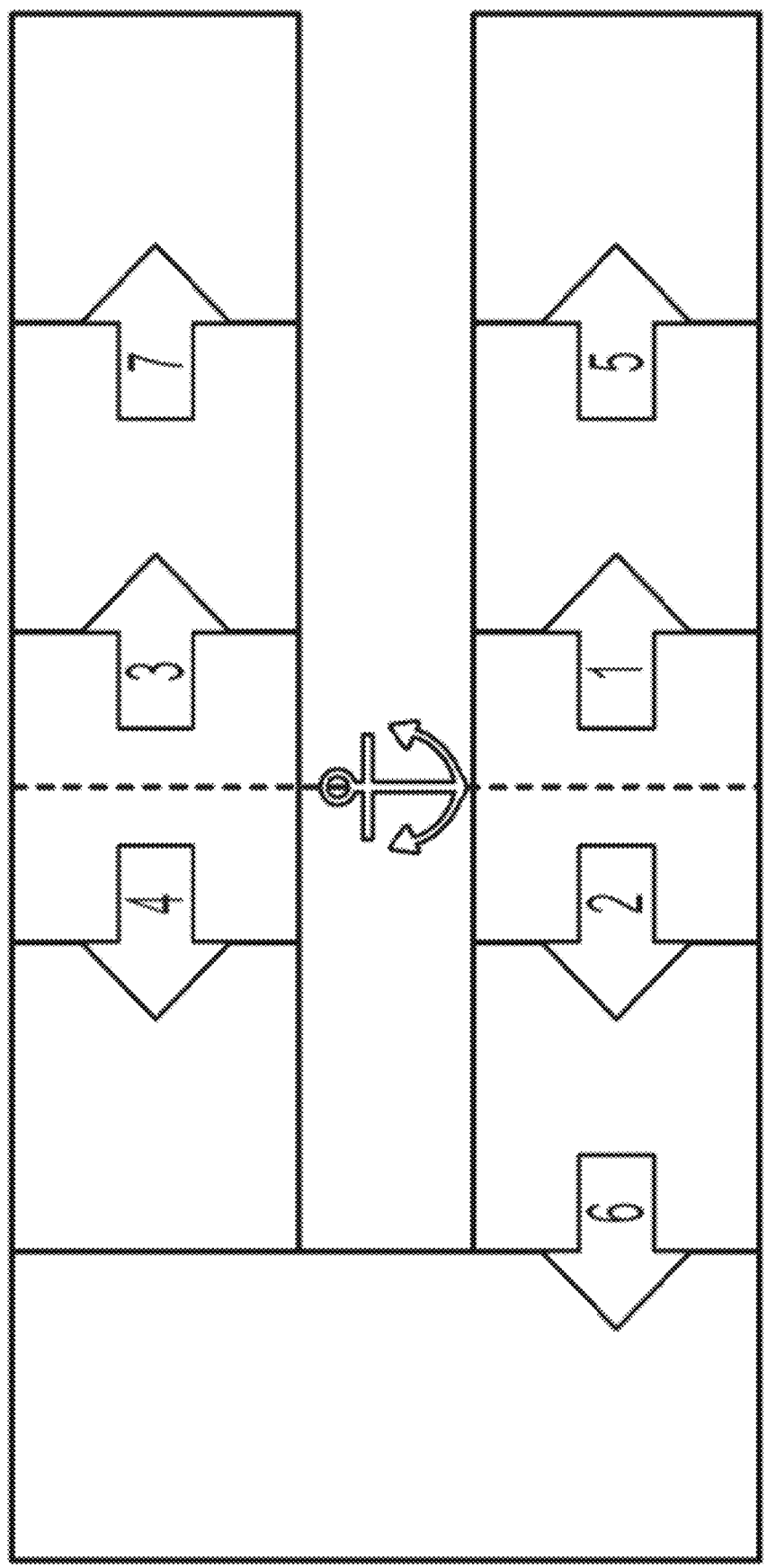
FIG. 18 shows an example technology for 3D placement of 3D models based on a 2D layout, in accordance with one or more embodiments disclosed herein.

In one or more scenarios, product identified in the inspiration image may be placed in the virtual environment with a starting element that forms the anchor for rendering the grouping of products in the 3D virtual environment, as illustrated in FIG. 18 and described below. For example, a table (e.g., identified in the inspiration image) can be placed on top of a starting element corresponding with a floor.

Each design intent may correspond with a ranked list of products to place in the room. The top products in the inspiration image that corresponds with the design intent may be identified and placed in a user's list of AR-enabled images of products. As an illustrative example, when an inspiration image is identified by the system as corresponding with an Acme Co. inspired living room (e.g., by matching the products and colors in the room with the stored inspiration images, and resulting in the highest match rate between the two sources over other stored inspiration images), the top product for mimicking the Acme Co. aesthetic may be an Acme Co. couch in the color brown (which can be stored in a data store corresponding with inspiration images). This top product may be added to the user's list (e.g., "add to AR list" icon 506 in FIG. 5) in the proper color/texture/pattern corresponding to the design intent.

In some examples, the system may automatically suggest or add products corresponding with the proper color/texture/pattern of the design intent, rather than interacting with the user to retrieve the color/texture/pattern of the product. In this manner, the system may automatically select these details to correlate with the product based on the inspiration image.

The product selection may be executed iteratively. For example, once the inspiration image is received, the composition of the virtual environment may add the AR-enabled images of products iteratively, starting with composing the preliminary virtual environment, then adding the top product for the design intent. Additional AR-enabled images of products can be added to the virtual environment (e.g., as space is available or as long as the newly added products comply with the placement rules). Virtual objects may be added to and/or subtracted from the modified virtual environment and then may be modified again, repeating over and over in an iterative process.

In some examples, the size of the products corresponding with the inspiration image may be determined based on the amount of space is available in the user's room dimensions and rules and/or metadata defining fit, location, and/or compatibility, as described with FIG. 1. For example, the brown couch corresponding with the design intent of the inspiration image may be selected in a five-foot frame rather than a ten-foot frame to correspond with the amount of wall space the user has available in the AR-generated room.

FIG. 18 shows an example technology for 3D placement of AR-enabled images of the 3D models based on a 2D layout according to the present disclosure. In this illustration, AR-enabled images of the 3D models may be (e.g., automatically) placed in one or more 3D virtual environments, for example, by virtue of adjacency to an anchor point and/or to a previously placed AR-enabled images of the 3D model. For example, the relative position of a 3D model of a product to one or more, or all, of the adjacent 3D models and/or surfaces may be used to place the 3D model represented in the 2D layout at a location in the one or more 3D virtual environments.

One or more entry points and/or anchor points may be found from the 3D models to be placed in the one or more 3D virtual environments in accordance with placement rules. For example, if the 3D models chosen from the 2D layout do not include a specified anchor, among other scenarios, then the placement rules may instruct the processor generating the 3D environment to proceed from left to right through the chosen AR-enabled images of the 3D models. The placement of the AR-enabled images of product may perform automatic placement of the AR-enabled images or may proceed upon receiving feedback from a user input. For example, after a starting point is determined (e.g., from placement rules), the 3D models may be placed using the placement rules. A placement may follow an available path of unvisited 3D models, for example, until it reaches a dead-end. In one or more scenarios, one or more new (e.g., fresh and/or previously unused) paths of unvisited 3D models may be started.

In one or more scenarios, this may be repeated until one or more, or all, paths are visited. For example, if the 3D models selected from the layout include one or more, or multiple, anchors and/or gaps between 3D models that are on different surfaces, among other scenarios, then another input may be automatically selected to pick at least one 3D position to establish one or more new (e.g., fresh and/or previously unused) starting points.

In one or more scenarios, the starting location for (e.g., automatic) placement of 3D models might not utilize user input. In one or more scenarios, the starting location for (e.g., automatic) placement of 3D models may be chosen by one or more placement rules or algorithms, for example using information about the dimensions of the walls, floors, and/or ceilings of the virtual environment, and/or locations of existing 3D models previously placed within the virtual environment, among others. In one or more scenarios, the placement rules may determine if already placed 3D models may (e.g., should) be moved, for example in order to accommodate further (e.g., automatic) placement of one or more additional 3D models.

In one or more scenarios, the placement rules may (e.g., iteratively) modify placement(s), in order to establish the (e.g., most optimal) locations for one or more, or all, (e.g., automatically) placed 3D models in accordance with one or more arrangement/decor style rules. In one or more scenarios, the (e.g., automatic) placement of 3D models may identify the usefulness (e.g., requirement) of one or more additional 3D models that may fit into the (e.g., optimal) space. For example, 3D models for cabinets may be (e.g., automatically) placed along a wall to fit from one corner to another corner. The wall length may be such that a gap may be present between the ending wall and the ending cabinet. The (e.g., automatic) placement may identify within the local asset resource database 106 and/or remote resource database 122 one or more additional fill models which, when placed accordingly, may close the gap. In one or more scenarios, the (e.g., automatic) placement may identify when (e.g., automatically) placed 3D models or images of products may conflict with one or more (e.g., predetermined) layout rules and/or regulations. For example, the (e.g., automatic) placement of cabinets along a wall may identify if cabinets were too close to a stove hood, perhaps causing a violation of fire code(s).

In one or more scenarios, the one or more 3D models may include associated mounting data, and/or one or more mounting points, that may define one or more 3D locations and/or bounds of the 3D model, which may be used as reference points for subsequent models against which to be placed. In one or more scenarios, the mounting data might not be directly associated with the 3D model and/or may be computed at runtime, for example, based on the extents of the 3D model geometry, the type of object the 3D geometry represents, such as a table or a lamp, and/or one or more rules associating types of geometry to the generation of one or more mounting points.

For example, a 3D model of a table may be processed at runtime and/or the extents of the geometry may be used to create 3D mounting points at the top corners of the table top. One or more rules associated with table geometry may be invoked, causing an additional mounting point to be created at the center of the table top, for example, at the geometric center of the four corners of the table top. In one or more scenarios, the 3D mounting points may contain data describing the types of 3D model geometry to which they may be used for placement. For example, one or more mounting points created on a table top may be created with data indicating that the one or more mounting points may be used for placement of table lamps.

In one or more scenarios, the placement rules may proceed through (e.g., automatic) placement of 3D models of products. The placement rules may consider the unused mounting points and/or associated mounting data within the 3D virtual environment, for example, in order to determine viable locations for placing the remaining 3D model data, among other reasons. In one or more scenarios, the 3D mounting points may be replaced along 3D planes that may describe a geometric surface of a 3D model. For example, a mounting plane for a table top may be defined using the surface normal of the table top and/or the extents of the table top geometry. In one or more scenarios, the placement rules may consider the mounting planes and/or associated mounting data within the 3D virtual environment, for example, in order to determine one or more viable locations for placing the remaining 3D model data.

In one or more scenarios, the placement rules may identify one or more, or multiple, mounting points and/or mounting planes, and may prioritize which mounting point(s) and/or plane(s) that may be based on one or more aesthetic rules associated with the 2D image, and/or provided from another source. In one or more scenarios, the one or more aesthetic rules may provide hierarchical information specifying precedence of characteristics. For example, one or more aesthetic rules may specify mounting points furthest from windows may be higher priority for placing table lamps than mounting surfaces closest to windows. The placement rules may use the one or more aesthetic rules to filter the viable mounting points and/or planes within the 3D virtual environment, for example, until a suitable (e.g., most suitable) mounting location is identified.

Figure 19:
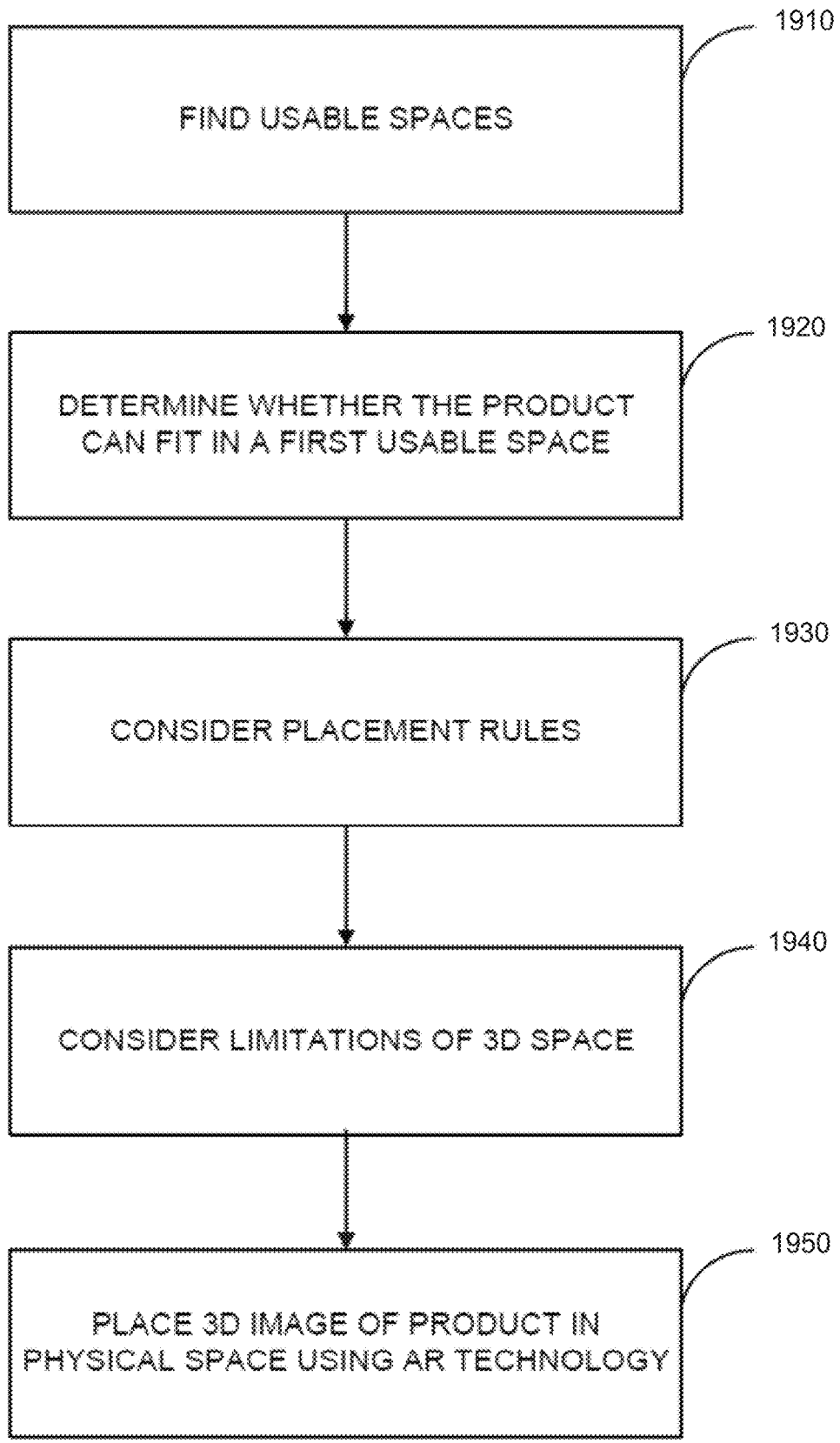
FIG. 19 illustrates a process of placing 3D models in the virtual environment, in accordance with one or more embodiments disclosed herein.

FIG. 19 illustrates a process of placing 3D models in the virtual environment, in accordance with one or more embodiments disclosed herein. The process may be implemented by local computing device 102.

At block 1910, the process may find usable spaces in the virtual environment. For example, the process may identify walls, windows, doors, or other stationary objects that have been incorporated with the virtual space. Measurements of the remaining spaces in the virtual environment may be determined as usable spaces to place 3D objects. In some examples, the 3D objects may correspond with inspirational design elements depicted in a photograph.

At block 1920, the process may identify objects that can fit in the usable spaces. For example, a subset of 3D objects stored in a computer memory (e.g., local resource database 106 or master resource database 122) may be determined as products that can fit in the usable space. This can be illustrated as a ten-foot wide cabinet being unavailable to fit on a four-foot wide wall of the virtual environment and/or four-feet of remaining usable space.

At block 1930, the process may consider placement rules of the objects. For example, the photograph may help determine placement rules based on the original design intent of the room (e.g., corresponding with a shared parameter or tag, classified as related to a design intent), but adjust the layout for different size and shape rooms. In another example, the objects may be placed starting with an anchor point and added around the anchor point.

At block 1940, the process may consider limitations of the virtual environment. For example, the corners, doorways, and windows of the virtual environment may be determined and identified as non-usable space. Objects may be removed from these limitations located around the environment.

At block 1950 the process may fill in the gaps in the virtual environment between the placed objects. For example, if the cabinets do not fill a full wall of the environment, a spacer that corresponds with the additional space or gap in the environment may be identified from the master resource database 122 or local resource database 106. The spacer may be used to fill in the gap without adding additional storage space in the virtual environment.

Figure 20:
FIG. 20 illustrates an AR-enabled product placed in a virtual environment, in accordance with one or more embodiments disclosed herein.

FIG. 20 illustrates an AR-enabled image of product 2010 placed in an AR-enabled environment, in accordance with one or more embodiments disclosed herein. In this example, the environment may be displayed at an interface of mobile computing device 102. The camera of mobile computing device 102 may be directed at a corner of the physical environment where mobile computing device 102 is located. The system may automatically place the AR-enabled images of product 2010 in the environment in accordance with the placement rules and limitations of the virtual environment described herein.

Various placement rules may be described and implemented herein. For example, when a single product is placed in an AR-enabled environment, the placement rules may anchor the product in the room in relation to a single 3D plane. This may include, for example, anchoring the product to the floor (e.g., x-axis) or to the wall (e.g., y-axis) and not floating in the middle of the AR-enabled environment (e.g., z-axis). When more than one product is placed in the AR-enabled environment, the placement rules may anchor the products in relation to one or more 3D planes or in relation to each other. This may include, for example, anchoring the product to the floor or to the wall, as well as anchoring the product to other products in the list of AR-enabled images of products (e.g., placing the lamp on the table, placing the chair next to the desk, etc.). In other examples, the placement rules may provide a default placement at the user interface of mobile computing device 102 (e.g., all products in a row on two planes) and allow the user to interact with the interface to place the products in the AR-enabled environment.

Figure 21:
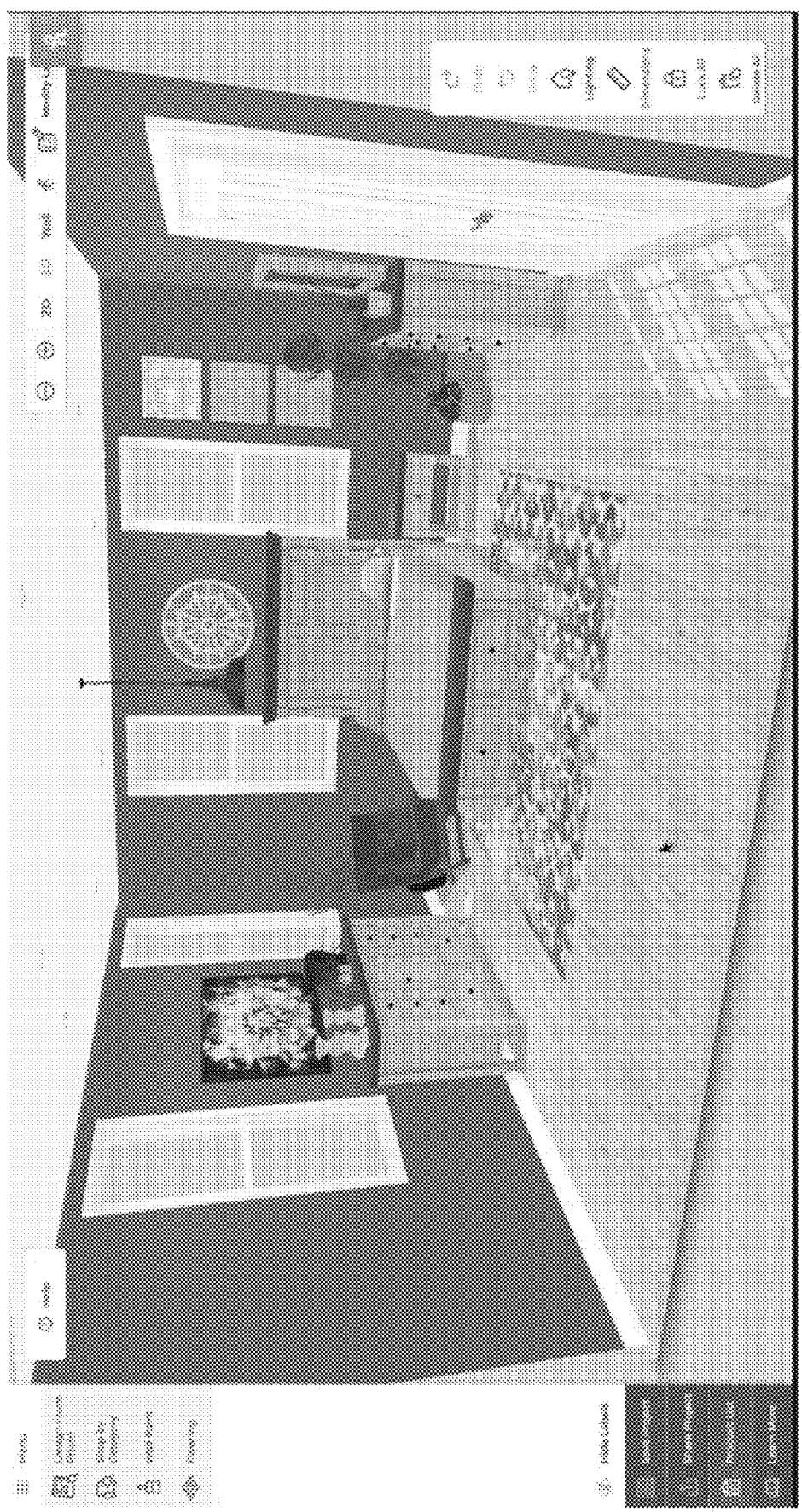
FIG. 21 illustrates an embodiment of one or more AR-enabled images of products placed in a virtual environment, in accordance with one or more embodiments disclosed herein.

FIG. 21 illustrates an alternate embodiment of one or more AR-enabled images of products placed in a virtual environment, in accordance with one or more embodiments disclosed herein. In this example, the environment may be displayed at an interface of mobile computing device 102, where the environment is not associated with the location of mobile computing device 102. One or more products may be placed in the environment in accordance with the placement rules and limitations of the virtual environment described herein.

Figure 22:
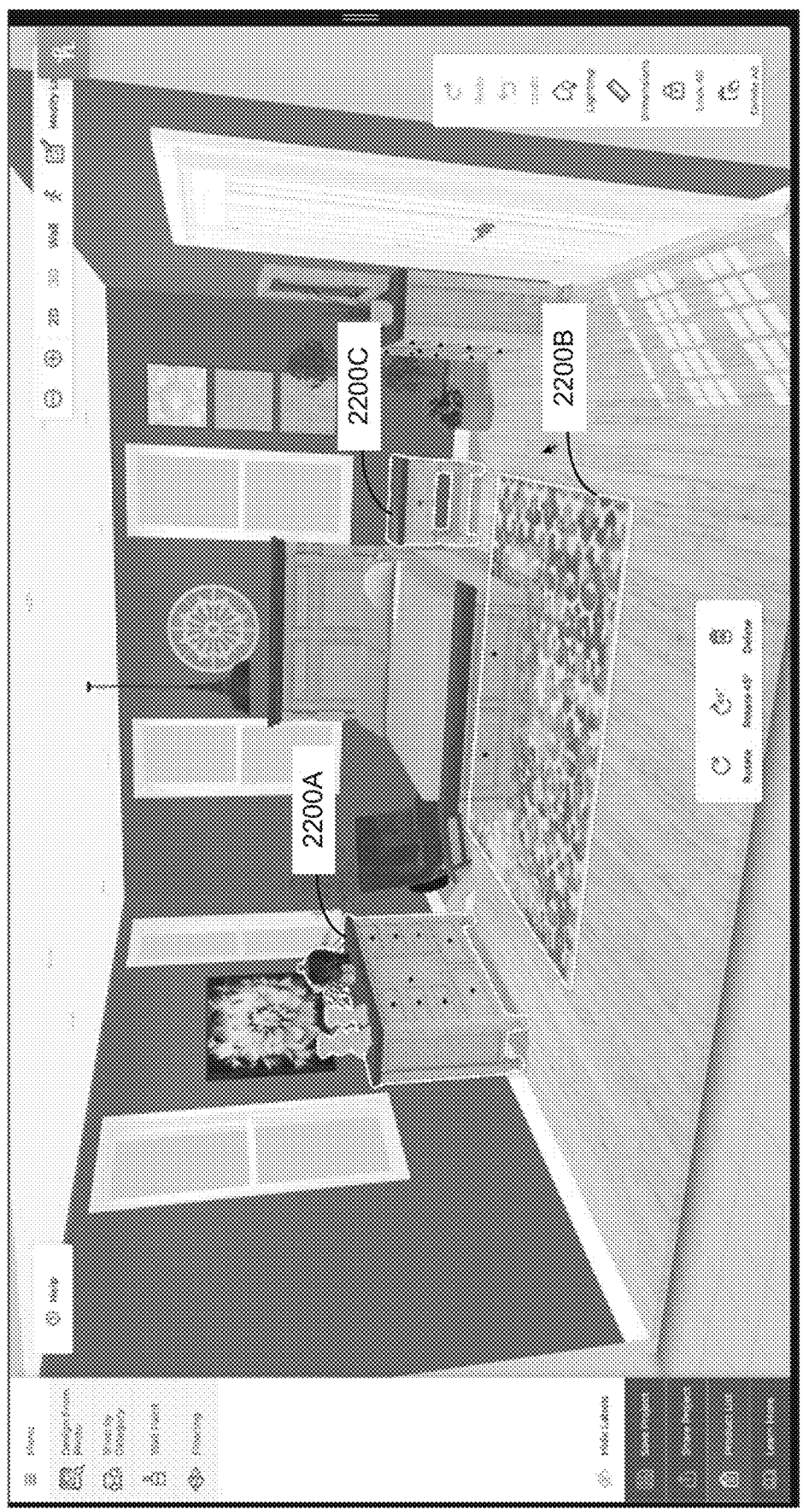
FIG. 22 illustrates one or more AR-enabled images of products placed in a virtual environment, in accordance with one or more embodiments disclosed herein.

Any of these products may be selectable, as shown in FIG. 22. For example, the AR-enabled images of products 2200 (illustrated as first AR-enabled product 2200A, second AR-enabled product 22008, and third AR-enabled product 2200C) may be highlighted or otherwise identified as movable or replaceable within the virtual environment. When identified as replaceable, one or more of the stored AR-enabled images of products may be used to replace the product illustrated in the virtual environment. When identified as movable, the AR-enabled product may be moved in accordance with the placement rules and limitations of the virtual environment described herein.

Figure 23:
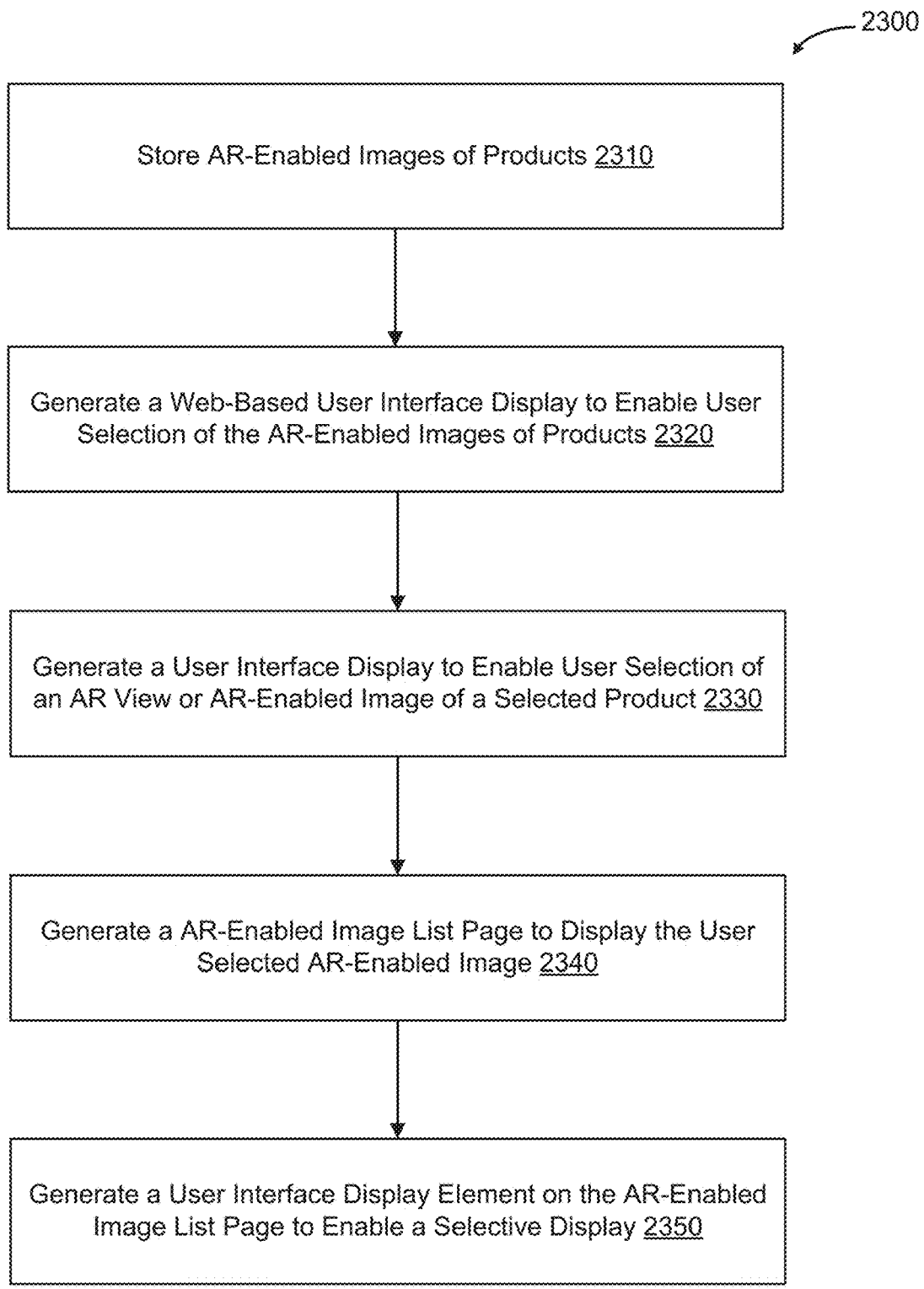
FIG. 23 is a flow diagram of at least one example method for enhancing product visualization, in accordance with one or more embodiments disclosed herein.

FIG. 23 is a flow diagram of at least one example method for enhancing product visualization, in accordance with one or more embodiments disclosed herein. In some embodiments, method 2300 may be embodied as various instructions stored on a computer-readable media, which may be executed by a processor (e.g., the processor 200) and/or other components of mobile computing device 102 to cause mobile computing device 102 to perform method 2300. The computer-readable media may be embodied as any type of media capable of being read by mobile computing device 102 including, but not limited to, memory 204, data storage device 212, other memory or data storage devices of mobile computing device 102, portable media readable by a peripheral device of mobile computing device 102, and/or other media.

Method 2300 begins in block 2310, in which mobile computing device 102 stores an AR-enabled image of one or more products. In some examples, mobile computing device 102 stores AR-enabled images of products and non AR-enabled images of products.

In block 2320, mobile computing device 102 generates a web-based user interface display. This may help enable a user selection of the AR-enabled images of products that are provided via the user interface. In some examples, the user may select i) to view an AR-enabled view of the product in a room; or ii) save an AR-enabled image of the first selected product to an AR-enabled images list.

In some examples, for a selected product, mobile computing device 102 may determine whether an AR-enabled image of the product is stored (e.g., at mobile computing device 102) and for products for which there is no AR-enabled image of the product stored, prevent display of an option to view an AR-enabled view of the product in the room. When no AR-enabled image is available, the system may display a second webpage on mobile computing device 102 and display in a room an AR-enabled view of one or more selected products from the list of AR-enabled images on the second webpage.

In some examples, for a selected product, mobile computing device 102 may determine whether an AR-enabled image of the product is stored (e.g., at mobile computing device 102) and for such products, display an option to view an AR-enabled view of the product in the room.

In block 2330, mobile computing device 102 generates an user interface display. This may help enable a user selection of an AR-enabled view or AR-enabled image of a selected product that are provided via the user interface.

In block 2340, mobile computing device 102 generates an AR-enabled image list page. This may help enable the display of the user selected AR-enabled image provided via the user interface. In some examples, the display may include a set of user-selected AR-enabled images on a single view via the page.

In block 2350, mobile computing device 102 generates an user interface display element on the AR-enabled image list page. This may help enable a selective display provided via the user interface. In some examples, the selective display enables the user to select one of the AR-enabled image to selectively display an AR-enabled view of the corresponding product in room.

Figure 24:
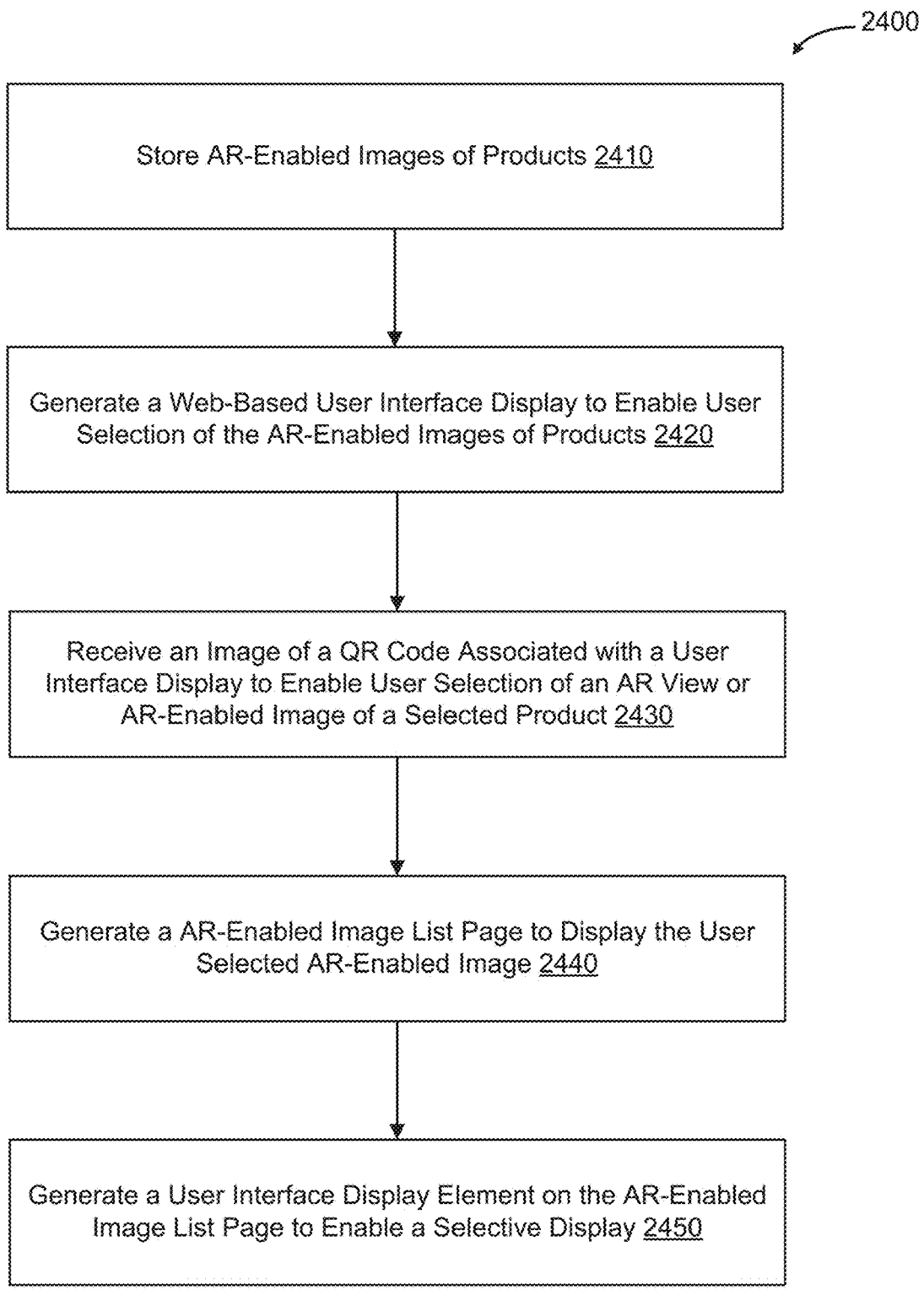
FIG. 24 is a flow diagram of at least one example method for enhancing product visualization, in accordance with one or more embodiments disclosed herein.

FIG. 24 is a flow diagram of at least one example method for enhancing product visualization, in accordance with one or more embodiments disclosed herein. In some embodiments, method 2400 may be embodied as various instructions stored on a computer-readable media, which may be executed by a processor (e.g., processor 200) and/or other components of mobile computing device 102 to cause mobile computing device 102 to perform method 2400. The computer-readable media may be embodied as any type of media capable of being read by mobile computing device 102 including, but not limited to, memory 204, data storage device 212, other memory or data storage devices of mobile computing device 102, portable media readable by a peripheral device of mobile computing device 102, and/or other media.

Method 2400 begins in block 2410, in which mobile computing device 102 stores an AR-enabled image of one or more products.

In block 2420, mobile computing device 102 generates a web-based user interface display. This may help enable a user selection of the AR-enabled images of products that are provided via the user interface.

In block 2430, mobile computing device 102 receives an image of a QR code associated with an user interface display. This may help enable a user selection of an AR-enabled view or AR-enabled image of a selected product that are provided via the user interface. In some examples, the user may select i) to view an AR-enabled view of the product in a room; or ii) save an AR-enabled image of the first selected product to an AR-enabled images list.

In block 2440, mobile computing device 102 generates an AR-enabled image list page. This may help enable the display of the user selected AR-enabled image provided via the user interface. In some examples, the display may include a set of user-selected AR-enabled images on a single view via the page.

In block 2450, mobile computing device 102 generates an user interface display element on the AR-enabled image list page. This may help enable a selective display provided via the user interface. In some examples, the selective display enables the user to select one of the AR-enabled image to selectively display an AR-enabled view of the corresponding product in room.

This patent application incorporates by reference U.S. Pat. Nos. 10,600,255, 10,672,191, and 11,049,317 in their entirety for all purposes.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 24. Various embodiments are described in terms of this example logical circuit 2400. After reading this description, it will become apparent to a person skilled in the relevant art how to implement the technology using other logical circuits or architectures.

Figure 25:
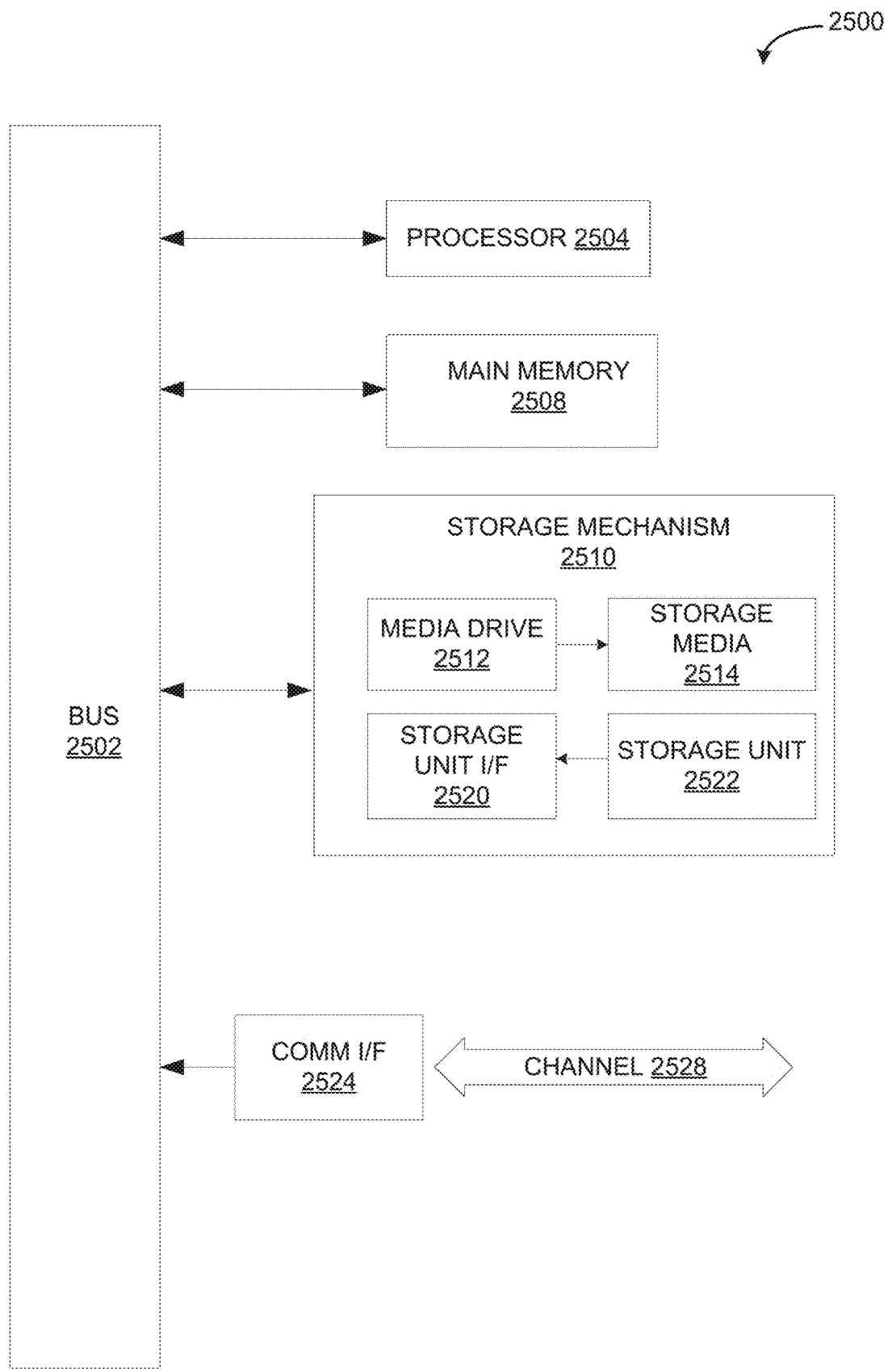
FIG. 25 is an example of a computing system that may be used in implementing various features of embodiments of the disclosed technology.

Referring now to FIG. 25, computing system 2500 may represent, for example, computing or processing capabilities found within desktop, laptop, and notebook computers; hand-held computing devices (PDA's, smartphones, cell phones, palmtops, etc.); mainframes, supercomputers, workstations, or servers; or any other type of special-purpose or general-purpose computing devices as may be desirable or appropriate for a given application or environment. Logical circuit 2500 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals, and other electronic devices that might include some form of processing capability.

Computing system 2500 might include, for example, one or more processors, controllers, control engines, or other processing devices, such as a processor 2504. Processor 2504 might be implemented using a general-purpose or special-purpose processing engine such as, for example, a microprocessor, controller, or other control logic. In the illustrated example, processor 2504 is connected to a bus 2502, although any communication medium can be used to facilitate interaction with other components of logical circuit 2500 or to communicate externally.

Computing system 2500 might also include one or more memory engines, simply referred to herein as main memory 2508. For example, preferably random-access memory (RAM) or other dynamic memory, might be used for storing information and instructions to be executed by processor 2504. Main memory 2508 might also be used for storing temporary variables or other intermediate information during execution of instructions to be executed by processor 2504. Logical circuit 2500 might likewise include a read only memory ("ROM") or other static storage device coupled to bus 2502 for storing static information and instructions for processor 2504.

The computing system 2500 might also include one or more various forms of information storage mechanism 2510, which might include, for example, a media drive 2512 and a storage unit interface 2520. The media drive 2512 might include a drive or other mechanism to support fixed or removable storage media 2514. For example, a hard disk drive, a floppy disk drive, a magnetic tape drive, an optical disk drive, a CD or DVD drive (R or RW), or other removable or fixed media drive might be provided. Accordingly, storage media 2514 might include, for example, a hard disk, a floppy disk, magnetic tape, cartridge, optical disk, a CD or DVD, or other fixed or removable medium that is read by, written to, or accessed by media drive 2512. As these examples illustrate, the storage media 2514 can include a computer-usable storage medium having stored therein computer software or data.

In alternative embodiments, information storage mechanism 2540 might include other similar instrumentalities for allowing computer programs or other instructions or data to be loaded into logical circuit 2500. Such instrumentalities might include, for example, a fixed or removable storage unit 2522 and an interface 2520. Examples of such storage units 2522 and interfaces 2520 can include a program cartridge and cartridge interface, a removable memory (for example, a flash memory or other removable memory engine) and memory slot, a PCMCIA slot and card, and other fixed or removable storage units 2522 and interfaces 2520 that allow software and data to be transferred from the storage unit 2522 to logical circuit 2500.

Logical circuit 2500 might also include a communications interface 2524. Communications interface 2524 might be used to allow software and data to be transferred between logical circuit 2500 and external devices. Examples of communications interface 2524 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 2524 might typically be carried on signals, which can be electronic, electromagnetic (which includes optical) or other signals capable of being exchanged by a given communications interface 2524. These signals might be provided to communications interface 2524 via channel 2528. This channel 2528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2508, storage unit 2520, media 2514, and channel 2528. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the logical circuit 2500 to perform features or functions of the disclosed technology as discussed herein.

Although FIG. 25 depicts a computer network, it is understood that the disclosure is not limited to operation with a computer network, but rather, the disclosure may be practiced in any suitable electronic device. Accordingly, the computer network depicted in FIG. 25 is for illustrative purposes only and thus is not meant to limit the disclosure in any respect.

While various embodiments of the disclosed technology have been described above, it should be understood that they have been presented by way of example only and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open-ended as opposed to limiting. As examples of the foregoing: the term "including" should be read as meaning "including, without limitation" or the like; the term "example" is used to provide exemplary instances of the item in the discussion not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A cloud-based computer system for enabling a user to select and save a list of Augmented Reality (AR)-enabled products from a first user computer and access AR-image enabled images of the AR-enabled products via a second computer, the second computer comprising a mobile user device, the cloud-based computer system comprising:
  a cloud-based computer processor programmed with machine-readable instructions, which when executed by the cloud-based computer processor, cause the cloud-based computer processor to:
  store a catalog of products and product image information, comprising an indication of whether the product is AR enabled;
  store a 3D image definition of the products;
  generate a web-based user interface display comprising:
  i) display of a set of products and an indication of whether individual ones of the products are AR-enabled;
  ii) display elements to enable user selection of individual ones of the products from the first user computer; and
  iii) display options, for individual ones of the selected products which are AR-enabled, comprising: x) a view in AR room icon to display an AR image of the product in an AR-generated image of a physical environment of the user; or y) store the product to a user-specific AR-enabled list in the cloud-based computer system;

generate a display of a computer readable code configured to enable display of the AR-enabled images of the products in the AR-enabled list;

generate, upon scanning of the computer readable code by the mobile user device, a user interface display, on a display associated with the mobile user device, comprising the AR-enabled images of the products on the user-specific AR-enabled list and display options for interacting with the AR-enabled images via the mobile user device; and a rendering engine configured to render the AR-enabled images of products in real-time based the 3D image definition of the products.

2. The cloud-based computer system of claim 1, the web-based user interface display comprising display elements configured to enable user selection of the AR-enabled images of products and non AR-enabled images of products, wherein the machine-readable instructions when executed by the processor, cause the system to determine, for a selected product, whether an AR-enabled image of the product is stored and for such products, display an option to view an AR-enabled view of the product in the room.

3. The cloud-based computer system of claim 1, the web-based user interface display comprising display elements configured to enable user selection of the AR-enabled images of products and non AR-enabled images of products, wherein the machine-readable instructions when executed by the cloud-based computer processor, cause the system to determine, for a selected product, whether an AR-enabled image of the product is stored and for products for which there is no AR-enabled image of the product stored, prevent display of an option to view an AR-enabled view of the product in the room.

4. The cloud-based computer system of claim 1, comprising at least a first webpage of product images, comprising a first icon that indicates the product images for which an AR-enabled image is available and a second icon that that enables users to save a list of AR-enabled images of products for display to a second webpage.

5. The cloud-based computer system of claim 4, wherein the machine-readable instructions, when executed by the cloud-based computer processor, cause the system to display the second webpage on a user device and display in a room an AR-enabled view of one or more selected products from the list of AR-enabled images on the second webpage.

6. The cloud-based computer system of claim 1, wherein the machine-readable instructions when executed by the cloud-based computer processor, cause the system to dynamically generate a "view in AR room" display option when a selected product has a corresponding AR-enabled image stored in the system.

7. The cloud-based computer system of claim 1, wherein the machine-readable instructions when executed by the cloud-based computer processor, cause the system to generate a computer readable code, which when scanned by a mobile device, displays the user-specific AR-enabled list on a display of the mobile device.

8. The cloud-based computer system of claim 1, the web-based user interface display comprising:
i) a product display area;
ii) an add to AR List element to enable the user to select a displayed product, for which there is an indication that the product is AR-enabled, for inclusion in the user-specific AR-enabled list;
iii) a display AR list element which enables the user to select to see a web page with the user's selection of AR-enabled images of products for which the user has selected to add to the user-specific AR-enabled list; and
iv) a view in room element that enables the user to select to display an AR-enabled view of the selected product in a room in which the user is located at the time.

9. The cloud-based computer system of claim 8, the web-based user interface display further comprising display elements, comprising:
an add to cart element to select a product from the user-specific AR-enabled list for purchase;
a share element to enable the user to share a selected product image with others from a web-based user interface display page; and
an option to select to add 3D models of one or more user-selected products from the user-specific AR-enabled list to a virtual room planner.

10. The cloud-based computer system of claim 1, the stored catalog of products and product image information, comprising for individual products, a stored image of a product and 3D model information for the product and further comprising:
a virtual room planner module configured for displaying a virtual room planner; and
wherein the web-based user interface display is configured to enable the user to select: i) one or more of the AR-enabled images to display an AR-enabled view of the corresponding product in room; and ii) one or more products to add to the virtual room planner; wherein the rendering engine is configured to render, based on the 3D image definition of the products, in the virtual room planner a 3D model of the products selected for addition to the virtual room planner display.

11. The cloud-based computer system of claim 10, wherein the of stored catalog of products and product information comprises a data schema comprising a stock-keeping unit (SKU) from a retailer for the product, wherein the machine-readable instructions when executed by the cloud-based computer processor, cause the system to populate an electronic shopping cart with information of a user selected product based on the SKU for the product.

12. The cloud-based computer system of claim 10, further comprising a database of stored photos of one or more products in a layout in a room and a list of products in the photo of the room; and metadata stored with individual photos linking the products in the photo with products in the of stored catalog of products and product information wherein the machine-readable instructions, when executed by the cloud-based computer processor, cause the system to display for a selected product from a room photo an AR-enabled view of the product in a room and an option to add the 3D model of the product to the virtual room planner display.

13. The cloud-based computer system of claim 10, the virtual room planner module comprising a favorite products page, wherein the machine-readable instructions, when executed by the cloud-based computer processor, cause the system to add to the favorite products page in the virtual room planner module, products selected by the user to be saved to the user-specific AR-enabled list.

14. The cloud-based computer system of claim 1, the system comprising a cloud-based platform that stored an electronic product catalog for a retailer, comprising a data schema comprising for individual products, a stock-keeping unit (SKU) information for the product and the stored catalog of products and product information includes, for the retailer, one or more visible properties of individual ones of the product comprising fabric, color, texture, and/or dimensions.

15. The cloud-based computer system of claim 1, comprising a photo-to-floor plan module for presenting a display with a photo of multiple products arranged in a predetermined layout within a room, the system be preconfigured to store for individual ones of the multiple products in the photo: i) an AR-enabled image of the product; and ii) 3D model information for the product, wherein one or more user interfaces comprise a first display element that, when selected, causes display of one or more of the products in an AR-enabled view of the product in a room and a second display element that, when selected, causes the 3D model of one or more of the products to be displayed in a virtual room planner.

16. The cloud-based computer system of claim 1, wherein the web-based user interface display includes a product display area, an "add to AR list" element, a "badge" displayed over the "add to AR list" element to display a number of products in the list of AR-enabled images, an AR list element, a "view in-home" element, an "add-to-cart" element and a share element;
the "add to AR list" element is configured to enable the user to select the displayed product for inclusion in the user's saved AR list, which is dynamically generated by the system to be displayed when the selected product has a corresponding AR-enabled image in the system;
the AR list element is configured to enable the user to select to see a single page with the user's selection of products for which the user has selected to add to the AR list;
the "view in-home" element is configured to enable the user to select to display an AR-enabled view of the selected product in a room in which the user is located at the time;
the "add-to-cart" element is configured to enable the user to purchase the selected product through a payment transaction process; and
the "share" element is configured to enable the user to share the product or product image with other users and a menu option to select other displays/features is configured to enable the user to add one or more products to a virtual room planner.

17. The cloud-based computer system of claim 1, comprising a single application comprising a 3D room design module comprising a virtual room planner configured to enable the user to: i) select products and create a room design; ii) search for products; iii) view products for which AR-enabled images are available in an AR-enabled view in the room; iv) select one or more products for the rendering engine to render a 3D model; v) place the 3D model in a desired location in a virtual view of the room via the virtual room planner; and vi) purchase desired products from a user interface of the single application.

18. A method for enabling a user to select and save a list of Augmented Reality (AR)-enabled products from a first user computer and access AR-image enabled images of the AR-enabled products via a second computer, the second computer comprising a mobile user device, the method comprising:
storing a catalog of products and product image information, comprising an indication of whether the product is AR-enabled;
storing a 3D image definition of the products;
generating a web-based user interface display comprising:
i) display of a set of products and an indication of whether individual ones of the products are AR-enabled;
ii) display elements to enable user selection of individual ones of the products from the first user computer; and
iii) display options, for individual ones of the selected products which are AR-enabled, comprising: x) a view in AR room icon to display an AR image of the product in an AR-generated image of a physical environment of the user; or y) store the product to a user-specific AR-enabled list in a cloud-based computer system;
generating a display of a computer readable code configured to enable display of the set of AR-enabled images of the products in the user-specific AR-enabled list;
generating, upon scanning of the computer readable code by the mobile user device, a user interface display, on a display associated with the mobile user device, comprising the AR-enabled images of the products on the user-specific AR-enabled list and display options for interacting with the AR-enabled images via the mobile user device; and
a rendering engine configured to render the AR-enabled images of products in real-time based the 3D image definition of the products.

19. The method of claim 18, wherein the web-based user interface display comprising display elements configured to enable user selection of the AR-enabled images of products and non AR-enabled images of products, and the method further comprising:
determining, for a selected product, whether an AR-enabled image of the product is stored and for such products, display an option to view an AR-enabled view of the product in a room.

20. The method of claim 18, wherein the web-based user interface display comprising display elements configured to enable user selection of the AR-enabled images of products and non AR-enabled images of products, and the method further comprising:
determining, for a selected product, whether an AR-enabled image of the product is stored and for products for which there is no AR-enabled image of the product stored, prevent display of an option to view an AR-enabled view of the product in a room.

21. The method of claim 18, further comprising at least a first webpage of product images, comprising a first icon that indicates the product images for which an AR-enabled image is available and a second icon that that enables users to save a list of AR-enabled images of products to a second webpage.

22. The method of claim 21, further comprising:
displaying the second webpage on a user device and display in a room an AR-enabled view of one or more selected products from the list of AR-enabled images on the second webpage.

23. The method of claim 18, further comprising:
generating a "view in AR room" display option when a selected product has a corresponding AR-enabled image stored in the system.

24. The method of claim 18, further comprising:
generating a computer readable code, which when scanned by a mobile device, displays the AR-enabled list on a display of the mobile device.

25. The method of claim 18, the web-based user interface display comprising:
  i) a product display area;
  ii) an add to AR List element to enable the user to select the displayed product for inclusion in the user's saved AR list;
  iii) a display AR list element which enables the user to select to see a single page with the user's selection of AR-enabled images of products for which the user has selected to add to the user's saved AR list; and
  iv) a view in home element that enables the user to select to display an AR-enabled view of the selected product in a room in which the user is located at the time.

26. The method of claim 25, the web-based user interface display further comprising one or more elements:
  an add to cart element to select a product from the user's saved AR list for purchase;
  a share element to enable the user to share the product image with others from the web-based user interface display page; and
  an option to select to add 3D models of one or more products from the user's saved AR list to a virtual room planner.

27. The method of claim 18, wherein a system for implementing the method further comprising:
  a database of stored electronic product catalog, comprising for individual products a stored AR-enabled image of the product and 3D model information for the product;
  a virtual room planner module; and
  wherein the user interface display is configured to enable the user to select one of the AR-enabled images to display an AR-enabled view of the corresponding product in room and is further configured to enable the user to select the product to add a 3D model of the product to the virtual room planner.

28. The method of claim 27, wherein the database of stored electronic products comprises a data schema comprising for a stock-keeping unit (SKU) from a retailer for the product, and the method further comprising:
  populating a shopping cart with information of a user selected product based on the SKU.

29. The method of claim 27, wherein the database further comprising one or more room photos, comprising a list of products in a room in a given layout; and metadata stored with individual photos linking the products in the photos with products in the database of stored electronic products and the method further comprising:
  displaying for a selected product from a room photo an AR-enabled view of the product in a room and an option to add the 3D model of the product to the virtual room planner module.

30. The method of claim 27, further comprising:
  saving to a favorite products page in the virtual room planner module, products selected by the user to be saved to the AR-enabled images list.

31. The method of claim 18, the system comprising a cloud-based platform that hosts an electronic product catalog for a retailer, comprising a data schema comprising for individual products, stock-keeping unit (SKU) information for the product.

32. The method of claim 18, wherein a system for implementing the method further comprising a photo-to-floor plan module for presenting a display with a photo of multiple products arranged in a predetermined layout within a room, the system be preconfigured to store for individual ones of the multiple products in the photo: i) an AR-enabled image of the product; and ii) 3D model information for the product, wherein one or more user interfaces comprise a first display element that, when selected, causes display of one or more of the products in an AR-enabled view of the product in a room and a second display element that, when selected, causes a 3D model of one or more of the products to be displayed in a virtual room planner.

* * * * *

UNITED STATES PATENT AND TRADEMARK OFFICE
CERTIFICATE OF CORRECTION

PATENT NO. : 11,734,929 B2
APPLICATION NO. : 17/816115
DATED : August 22, 2023
INVENTOR(S) : Bret Besecker et al.

It is certified that error appears in the above-identified patent and that said Letters Patent is hereby corrected as shown below:

In the Claims

Column 35, Line 65 (Claim 8, Line 4), change "AR List" to --AR list--.

Column 36, Line 38 (Claim 11, Line 2), change "the of" to --the--.

Column 36, Lines 49-50 (Claim 12, Lines 5-6), change "the of" to --the--.

Signed and Sealed this
Second Day of January, 2024

Katherine Kelly Vidal
Director of the United States Patent and Trademark Office